United States Patent
Lim et al.

(10) Patent No.: US 12,431,956 B2
(45) Date of Patent: Sep. 30, 2025

(54) METHOD AND DEVICE FOR PERFORMING BEAM SEARCHING IN MOBILE COMMUNICATION SYSTEM

(71) Applicant: SAMSUNG ELECTRONICS CO., LTD., Suwon-si (KR)

(72) Inventors: Chaeman Lim, Suwon-si (KR); Suyoung Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/841,568

(22) Filed: Jun. 15, 2022

(65) Prior Publication Data
US 2022/0312402 A1   Sep. 29, 2022

Related U.S. Application Data

(63) Continuation of application No. 16/658,551, filed on Oct. 21, 2019, now abandoned.

(30) Foreign Application Priority Data

Oct. 24, 2018 (KR) .......................... 10-2018-0127662

(51) Int. Cl.
*H04W 72/044* (2023.01)
*H04B 17/318* (2015.01)
(Continued)

(52) U.S. Cl.
CPC ........ *H04W 72/046* (2013.01); *H04B 17/318* (2015.01); *H04W 16/28* (2013.01);
(Continued)

(58) Field of Classification Search
CPC ... H04W 72/046; H04W 16/28; H04W 24/08; H04W 72/02; H04W 72/085;
(Continued)

(56) References Cited

U.S. PATENT DOCUMENTS

9,780,928 B2   10/2017 Moshfeghi
10,277,349 B1 *  4/2019 Kotecha ............... H04B 7/0695
(Continued)

FOREIGN PATENT DOCUMENTS

CN   105493547 A   4/2016
CN   106487437     3/2017
(Continued)

OTHER PUBLICATIONS

RP-181326, Change Request, Miscellaneous EN-DC corrections, Ericsson, GPP TSG-RAN Meeting #80, La Jolla, CA, USA, Jun. 11-14, 2018. (Year: 2018).*
(Continued)

*Primary Examiner* — Harry H Kim
(74) *Attorney, Agent, or Firm* — Nixon & Vanderhye P.C.

(57) ABSTRACT

The disclosure relates to a communication technique for a 5G communication system for supporting a higher data transfer rate after a 4G system, and a system therefor. The disclosure may be applied to an intelligent service (for example, a smart home, a smart building, a smart city, a smart car or connected car, healthcare, digital education, retail business, and a service relating to security and safety), based on a 5G communication technology and an IoT-related technology. The disclosure relates to a method and device for performing beam searching in a mobile communication system using beamforming.

18 Claims, 15 Drawing Sheets

(51) Int. Cl.
*H04W 16/28* (2009.01)
*H04W 24/08* (2009.01)
*H04W 72/02* (2009.01)
*H04W 72/542* (2023.01)
*H04W 84/04* (2009.01)

(52) U.S. Cl.
CPC .......... *H04W 24/08* (2013.01); *H04W 72/02* (2013.01); *H04W 72/542* (2023.01); *H04W 84/042* (2013.01)

(58) Field of Classification Search
CPC .. H04W 84/042; H04W 48/16; H04B 17/318; H04B 7/088; H04B 7/0695; H04B 7/0408; H04B 7/0857; H04B 7/0874
See application file for complete search history.

(56) References Cited

U.S. PATENT DOCUMENTS

| | | | |
|---|---|---|---|
| 10,348,422 B2 * | 7/2019 | Morishige | ............ H04W 16/28 |
| 10,517,061 B1 | 12/2019 | Kumar | |
| 2005/0096053 A1 | 5/2005 | Liu et al. | |
| 2011/0205969 A1 | 8/2011 | Ahmad | |
| 2013/0235851 A1 | 9/2013 | Abu-Surra et al. | |
| 2014/0139372 A1 | 5/2014 | Seol | |
| 2015/0050890 A1 | 2/2015 | Axmon et al. | |
| 2016/0212631 A1 | 7/2016 | Shen et al. | |
| 2016/0308637 A1 | 10/2016 | Frenne et al. | |
| 2017/0041085 A1 * | 2/2017 | Kwon | ............ H04L 25/02 |
| 2017/0207845 A1 | 7/2017 | Moon et al. | |
| 2017/0302338 A1 | 10/2017 | Lyu | |
| 2017/0366236 A1 | 12/2017 | Ryoo et al. | |
| 2018/0035396 A1 | 2/2018 | Stirlirig-Gallacher | |
| 2018/0048442 A1 | 2/2018 | Sang et al. | |
| 2018/0198664 A1 | 7/2018 | Lee | |
| 2018/0205421 A1 * | 7/2018 | Park | ............ H04W 64/006 |
| 2018/0254808 A1 | 9/2018 | Kobayashi | |
| 2018/0278311 A1 | 9/2018 | Qiu | |
| 2018/0287860 A1 | 10/2018 | Xia et al. | |
| 2018/0302819 A1 | 10/2018 | Lee et al. | |
| 2018/0331747 A1 | 11/2018 | Kakishima | |
| 2018/0338254 A1 * | 11/2018 | Ho | ............ H04B 7/063 |
| 2018/0343571 A1 | 11/2018 | Kim et al. | |
| 2019/0053321 A1 * | 2/2019 | Islam | ............ H04W 72/542 |
| 2019/0068270 A1 * | 2/2019 | Schenk | ............ H04B 7/088 |
| 2019/0116548 A1 | 4/2019 | Dudzinski | |
| 2019/0173547 A1 | 6/2019 | Li | |
| 2019/0208482 A1 * | 7/2019 | Tooher | ............ H04L 5/0092 |
| 2019/0238201 A1 | 8/2019 | Nilsson | |
| 2019/0246340 A1 | 8/2019 | Baek et al. | |
| 2019/0349960 A1 | 11/2019 | Li et al. | |
| 2019/0357159 A1 | 11/2019 | Pan et al. | |
| 2020/0022093 A1 | 1/2020 | Han | |
| 2020/0099426 A1 | 3/2020 | Simonsson | |
| 2020/0120528 A1 * | 4/2020 | Gao | ............ H04B 7/066 |
| 2020/0136709 A1 | 4/2020 | Wang | |
| 2020/0136878 A1 * | 4/2020 | Yi | ............ H04W 72/0453 |
| 2020/0236555 A1 | 7/2020 | Tomeba | |
| 2020/0296765 A1 * | 9/2020 | Kim | ............ H04W 56/001 |
| 2021/0076226 A1 * | 3/2021 | Nakayama | ............ H04B 7/086 |
| 2021/0235296 A1 * | 7/2021 | Kim | ............ H04B 7/0632 |
| 2023/0086052 A1 * | 3/2023 | Nam | ............ H04W 84/047 370/315 |

FOREIGN PATENT DOCUMENTS

| | | |
|---|---|---|
| CN | 107071796 B | 8/2017 |
| CN | 108353062 A | 7/2018 |
| CN | 108540176 A | 9/2018 |
| KR | 10-2013-0103443 | 9/2013 |
| KR | 10-2015-0013939 A | 2/2015 |
| KR | 10-2017-0141609 | 12/2017 |
| KR | 10-2019-0095071 A1 | 8/2019 |
| WO | 2005/046273 | 5/2005 |
| WO | WO 2017/097045 A1 | 6/2017 |
| WO | WO 2017/155238 A1 | 9/2017 |
| WO | WO 2018-129319 A1 | 7/2018 |
| WO | WO 2018-144337 A1 | 8/2018 |

OTHER PUBLICATIONS

Korean Office Action dated Dec. 6, 2023 for KR Application No. 10-2018-0127662.
Chinese Office Action dated Jan. 4, 2024 for CN Application No. 201980071308.6.
R4-1803601, RAN4#86 Meeting report, 3GPP TSG RAN WG4 #86bis, 3GPP dated Apr. 12, 2018.
Ericsson, RP-181326, Miscellaneous EN-DC corrections, 3GPP TSG RAN #80, 3GPP dated Jun. 15, 2018
Korean Office Action dated Jun. 28, 2023 for KR Application No. 10-2018-0127662.
U.S. Appl. No. 16/658,551, filed Oct. 21, 2019; Lim et al.
European Partial Search Report dated Oct. 25, 2021 for EP Application No. 19877067.9.
Extended European Search Report dated Mar. 7, 2022 for EP Application No. 19877067.9.
India Office Action dated Feb. 22, 2022 for IN Application No. 202117018436.
International Search Report and Written Opinion dated Mar. 6, 2020 in counterpart International Patent Application No. PCT/KR2019/013744.
Korean Rejection Decision dated Jun. 27, 2024 for KR Application No. 10-2018-0127662.
Korean Office Action dated Oct. 30, 2024 for KR Application No. 10-2018-0127662.

* cited by examiner

METHOD AND DEVICE FOR PERFORMING BEAM SEARCHING IN MOBILE COMMUNICATION SYSTEM

CROSS-REFERENCE TO RELATED APPLICATION

This application is a Continuation of U.S. application Ser. No. 16/658,551, filed Oct. 21, 2019, which claims priority to Korean Patent Application No. 10-2018-0127662, filed Oct. 24, 2018, the entire contents of which are all incorporated herein by reference in their entireties.

BACKGROUND

1) Field

The disclosure relates to a method and device for performing beam searching in a mobile communication system using beamforming.

2) Description of Related Art

In order to meet wireless data traffic demands increasing after commercialization of 4G communication system, efforts to develop an improved 5G communication system or a pre-5G communication system have been made. A 5G communication system is being considered to be implemented in a super-high frequency (mmWave) band (e.g., about 60 GHz band) to achieve a higher data transfer rate. To reduce the path loss of radio waves and increase the transfer distance of radio waves in a super-high frequency band, technologies including beamforming, massive multiple-input and multiple-output (MIMO), full dimensional MIMO (FD-MIMO), array antennas, analog beamforming, and large scale antennas have been discussed for a 5G communication system.

The above information is presented as background information only to assist with an understanding of the disclosure. No determination has been made, and no assertion is made, as to whether any of the above might be applicable as prior art with regard to the disclosure.

In a 5G communication system using a mmWave frequency band, a time required for beam searching during a beamforming procedure may be increased, and accordingly power consumed for beamforming may be increased. In addition, as a time required for beam searching is increased, a beam may fail to be changed according to a dynamically changing channel environment, and accordingly the probability of radio link failure (RLF) may be increased.

SUMMARY

Embodiments of the disclosure may provide a method and device for effectively managing a beam by a terminal in a 5G mobile communication system.

According to an example embodiment, an electronic device may include: a housing; at least one antenna array including antenna elements arranged in the housing or arranged in a part of the housing; at least one processor operably connected to the antenna array and configured to control the electronic device to generate a first reception beam set including N reception beams (Rx beams) having different directions and a second reception beam set including at least one reception beam having different directions using the antenna array; and a memory operably connected to the processor, wherein the memory is configured to store instructions which, when executed by the processor, control the electronic device to perform frequency scanning on signals transmitted from at least one base station using at least a part of the second reception beam set based on N being greater than a first threshold value, wherein N is an integer equal to or greater than 1, wherein a width of each reception beam included in the second reception beam set is greater than a width of each reception beam included in the first reception beam set.

According to an example embodiment, an electronic device may include: a housing; at least one antenna array including antenna elements arranged in the housing or arranged in a part of the housing; at least one processor operably connected to the antenna array and configured to control the electronic device to generate a first reception beam set including N reception beams (Rx beams) having different directions and a second reception beam set including at least one reception beam having different directions using the antenna array; and a memory operably connected to the processor, wherein the memory is configured to store instructions which, when executed by the processor, control the electronic device to: identify a frequency range for frequency scanning on signals transmitted from at least one base station using at least a part of the first reception beam set; and based on the frequency range being greater than a first threshold value, perform frequency scanning on the signals based on at least a part of the identified frequency range using at least a part of the second reception beam set, wherein N is an integer equal to or greater than 1, wherein a width of each reception beam included in the second reception beam set is greater than a width of each reception beam included in the first reception beam set.

According to an example embodiment, an electronic device may include: a housing; at least one antenna array including antenna elements arranged in the housing or arranged in a part of the housing; at least one processor operably connected to the antenna array and configured to control the electronic device to generate a first reception beam set including N reception beams (Rx beams) having different directions and a second reception beam set including at least one reception beam having different directions using the antenna array; and a memory operably connected to the processor, wherein the memory is configured to store instructions which, when executed by the processor, control the electronic device to: perform frequency scanning using at least a part of the first reception beam set or at least a part of the second reception beam set; measure strengths of signals of a plurality of transmission beams transmitted from at least one base station based on at least a part of a result of the frequency scanning using at least a part of the second reception beam set; and select a transmission beam among the transmission beams, based on at least a part of a result of the measurement, wherein N is an integer equal to or greater than 1, wherein a width of each reception beam included in the second reception beam set is greater than a width of each reception beam included in the first reception beam set.

According to an example embodiment, an electronic device may include: a housing; at least one antenna array including antenna elements arranged in the housing or arranged in a part of the housing; at least one processor operably connected to the antenna array and configured to control the electronic device to generate a first reception beam set including N reception beams (Rx beams) having different directions and a second reception beam set including at least one reception beam having different directions using the antenna array; and a memory operably connected to the processor, wherein the memory is configured to store instructions which, when executed by the processor, control the electronic device to: generate a first beam pair link with a first transmission beam transmitted from a first base station using a first reception beam included in a first reception beam set; measure a strength of at least one signal received through the first beam pair link; and measure strengths of signals transmitted from the first base station and/or at least one second base station adjacent to the first base station based on at least a part of a result of the measurement using the second reception beam set, wherein N is an integer equal to or greater than 1, wherein a width of each reception beam included in the second reception beam set is greater than a width of each reception beam included in the first reception beam set.

According to an example embodiment, an electronic device may include: a housing; at least one antenna array including antenna elements arranged in the housing or arranged in a part of the housing; at least one processor operably connected to the antenna array and configured to control the electronic device to generate a first reception beam set including N reception beams (Rx beams) having different directions and a second reception beam set including at least one reception beam having different directions using the antenna array; and a memory operably connected to the processor, wherein the memory is configured to store instructions which, when executed by the processor control the electronic device to: generate a first beam pair link with a first transmission beam transmitted from a first base station using a first reception beam included in the first reception beam set; identify a first number of at least one signal transmitted from the first base station through the first beam pair link; and measure strengths of signals transmitted from the first base station and/or at least one second base station adjacent to the first base station based on at least a part of the first number using the second reception beam set, wherein N is an integer equal to or greater than 1, wherein a width of each reception beam included in the second reception beam set is greater than a width of each reception beam included in the first reception beam set.

According to an example embodiment, a method for performing beam searching by an electronic device in a wireless communication system may include: determining a width of a beam for receiving a signal transmitted from a first base station; receiving a first synchronization signal (SS) block from the first base station based on the determined beam width; synchronizing with the first base station based on synchronization information included in the first SS block; and determining an index of a beam received from the first base station based on a first physical broadcast channel (PBCH) included in the first SS block.

According to the disclosure, a terminal may efficiently perform beam searching for beamforming, based on the ability of the terminal and an environment for communication with a base station.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
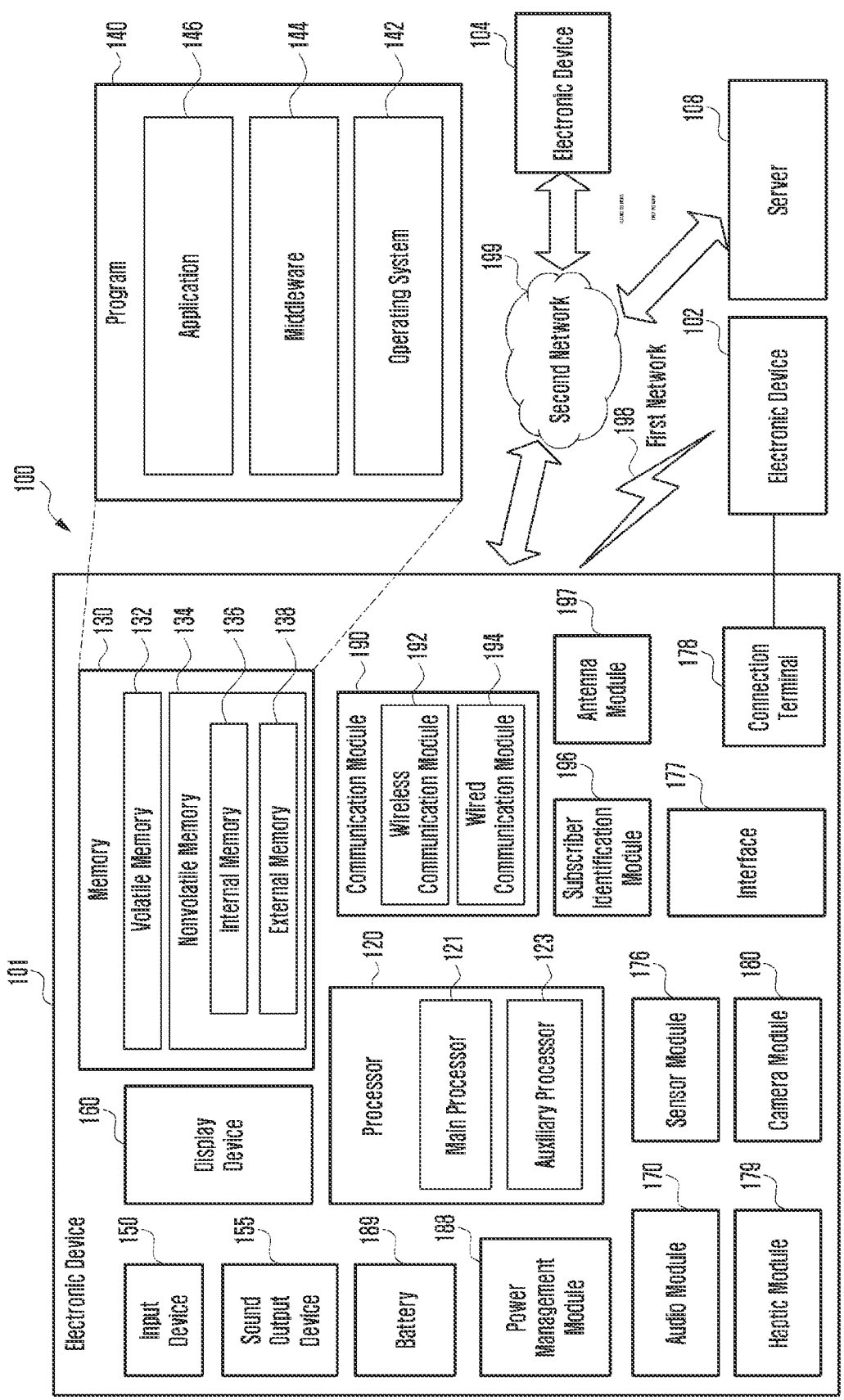
FIG. 1 is a block diagram illustrating an example electronic device in a network environment according to various embodiments.

In describing the various example embodiments, descriptions related to technical contents which are well-known in the art to which the disclosure pertains, and are not directly associated with the disclosure, may be omitted. Such an omission of unnecessary descriptions is intended to avoid obscuring of the main idea of the disclosure and more clearly describe the main idea.

For the same reason, in the accompanying drawings, some elements may be exaggerated, omitted, or schematically illustrated. Further, the size of each element does not entirely reflect the actual size. In the drawings, identical or corresponding elements may be provided with identical reference numerals.

The advantages and features of the disclosure and ways to achieve them will be apparent by making reference to the various example embodiments described in greater detail below in conjunction with the accompanying drawings. However, the disclosure is not limited to the various example embodiments set forth below, but may be implemented in various different forms. The following example embodiments are intended to be illustrative, not limiting. Throughout the disclosure, the same or like reference numerals may designate the same or like elements.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, when executed via the processor of the computer or other programmable data processing apparatus, control implementation of the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart block(s). The computer program instructions may also be loaded onto a computer or other programmable data processing apparatus to cause a series of operational steps to be performed on the computer or other programmable data processing apparatus to produce a computer implemented process such that the instructions when executed on the computer or other programmable data processing apparatus provide steps for implementing the functions specified in the flowchart block(s).

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession can in fact be executed substantially concurrently or the blocks can sometimes be executed in the reverse order, depending upon the functionality involved.

As used herein, the "unit" or "module" may refer, for example, to a software element, a hardware element, or any combination thereof, such as a field programmable gate array (FPGA) or an application specific integrated circuit (ASIC), which performs a predetermined function. However, the "unit" or "module" is not limited to software or hardware. The "unit" or "module" may be constructed either to be stored in an addressable storage medium or to execute one or more processors. Therefore, the "unit" or "module" includes, for example, and without limitation, software elements, object-oriented software elements, class elements or task elements, processes, functions, properties, procedures, sub-routines, segments of a program code, drivers, firmware, micro-codes, circuits, data, database, data structures, tables, arrays, executable program elements, parameters, or the like. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card. In addition, in an embodiment, the "unit" or "module" may include at least one processor.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
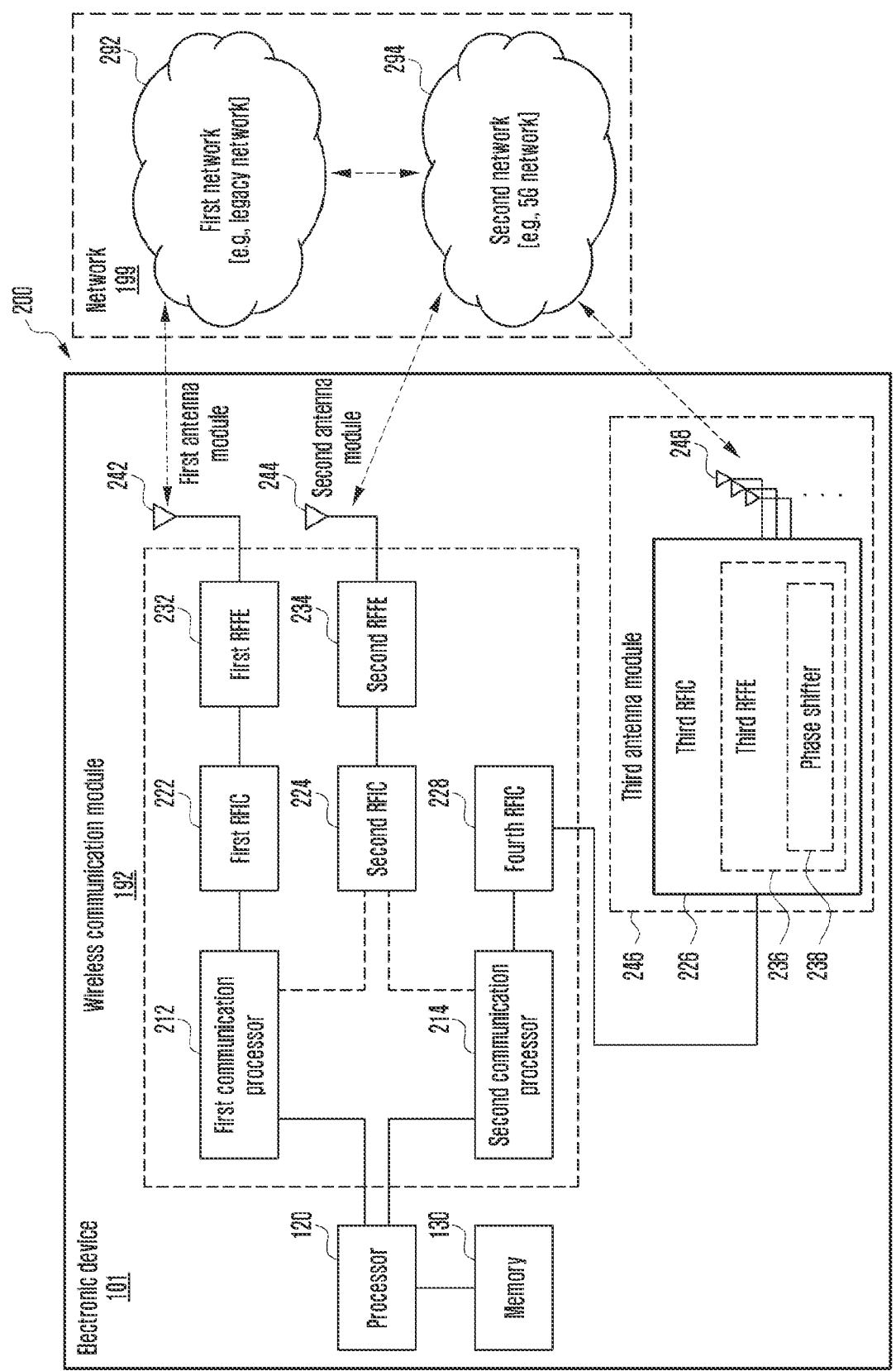
FIG. 2 is a block diagram illustrating an example electronic device for supporting legacy network communication and 5G network communication, according to various embodiments.

FIG. 2 is a block diagram 200 illustrating an example electronic device 101 for supporting legacy network communication and 5G network communication, according to various embodiments.

Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a third RFFE 236, a first antenna module 242, a second antenna module 244, a third antenna module 246 and an antenna 248. The electronic device 101 may further include a processor (e.g., including processing circuitry) 120 and a memory 130.

A network 199 may include a first network 292 and a second network 294. According to another embodiment, the electronic device 101 may further include at least one component among the components illustrated in FIG. 1, and the network 199 may further include at least another network. According to an embodiment, the first communication processor 212, the second communication processor 214, the first RFIC 222, the second RFIC 224, the fourth RFIC 228, the first RFFE 232, and the second RFFE 234 may form at least a part of a wireless communication module 192. According to another embodiment, the fourth RFIC 228 may be omitted or included as a part of the third RFIC 226.

The first communication processor 212 may include various processing circuitry and support establishment of a communication channel having a band to be used to wirelessly communicate with the first network 292, and support legacy network communication through the established communication channel.

According to various embodiments, the first network may, for example, be a legacy network including, for example, and without limitation, a second generation (2G), 3G, 4G, long term evolution (LTE) network, or the like.

The second communication processor 214 may include various processing circuitry and support establishment of a communication channel corresponding to a designated band (e.g., about 6 GHz-60 GHz) within a band to be used to wirelessly communicate with the second network 294, and support 5G network communication through the established communication channel. According to various embodiments, the second network 294 may, for example, be a 5G network as defined by 3GPP.

Additionally, according to an example embodiment, the first communication processor 212 or the second communication processor 214 may support establishment of a communication channel corresponding to another designated band (e.g., band equal to or smaller than about 6 GHz) within a band to be used to wirelessly communicate with the second network 294, and support 5G network communication through the established communication channel. According to an embodiment, the first communication processor 212 and the second communication processor 214 may be implemented in a single chip or a single package. According to various embodiments, the first communication processor 212 or the second communication processor 214 may be implemented in a single chip or a single package together with the processor 120, an auxiliary processor 123, or a communication module 190.

At the time of transmitting, the first RFIC 222 may convert a baseband signal generated by the first communication processor 212 into a radio frequency (RF) signal of about 700 MHz to 3 GHz used in the first network 292 (e.g., legacy network). At the time of receiving, a RF signal may be acquired from the first network 292 (e.g., legacy network) through an antenna (e.g., first antenna module 242) and then preprocessed through a RFFE (e.g., first RFFE 232)). The first RFIC 222 may convert the preprocessed RF signal into a baseband signal to be processed by the first communication processor 212.

At the time of transmitting, the second RFIC 224 may convert a baseband signal generated by the first communication processor 212 or the second communication processor 214 into a RF signal (hereinafter, 5G Sub6 RF signal) of a Sub6 band (e.g., band equal to or smaller than about 6 GHz) used in the second network 294 (e.g., 5G network). At the time of receiving, a 5G Sub6 RF signal may be acquired from the second network 294 (e.g., 5G network) through an antenna (e.g., second antenna module 244) and then preprocessed through an RFFE (e.g., second RFFE 234)). The second RFIC 224 may convert the preprocessed 5G Sub6 RF signal into a baseband signal to be processed by a corresponding communication processor among the first communication processor 212 or the second communication processor 214.

The third RFIC 226 may convert a baseband signal generated by the second communication processor 214 into a RF signal (hereinafter, 5G Above6 RF signal) of a 5G Above6 band (e.g., about 6 GHz-60 GHz) to be used in the second network 294 (e.g., 5G network). At the time of receiving, a 5G Above6 RF signal may be acquired from the second network 294 (e.g., 5G network) through an antenna (e.g., antenna 248) and preprocessed through a third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

The electronic device 101 may, according to an embodiment, include the fourth RFIC 228, as individually from or at least a part of the third RFIC 226. The fourth RFIC 228 may convert a baseband signal generated by the second communication processor 214 into a RF signal (hereinafter, IF signal) of an intermediate frequency band (e.g., about 9 GHz-11 GHz) and transfer the IF signal to the third RFIC 226. The third RFIC 226 may convert the IF signal into a 5G Above6 RF signal. At the time of receiving, a 5G Above6 RF signal may be received from the second network 294 (e.g., 5G network) through an antenna (e.g., antenna 248) and converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one antenna module among the first antenna module 242 and the second antenna module 244 may be omitted, or may be combined with another antenna module to process RF signals of a plurality of corresponding bands.

According to an embodiment, the third RFIC 226 and the antenna 248 may be arranged on the same substrate to form a third antenna module 246. For example, the wireless communication module 192 or the processor 120 may be disposed on a first substrate (e.g., main PCB). The third RFIC 226 is disposed in a partial area (e.g., lower surface) of a second substrate (e.g., sub PCB) separate from the first substrate, and the antenna 248 is disposed in another partial area (e.g., upper surface), whereby the third antenna module 246 may be formed. The length of a transmission line between the third RFIC 226 and the antenna 248 can be reduced by placing the third RFIC 226 and the antenna 248 on the same substrate. For example, the placement may reduce a loss (e.g., attenuation), due to the transmission line, of a signal of a high frequency band (e.g., about 6 GHz-60 GHz) used in 5G network communication. Therefore, the electronic device 101 can be improved in the quality or speed of communication with the second network 294 (e.g., 5G network).

According to an embodiment, the antenna 248 may be configured as an antenna array including a plurality of antenna elements which can be used for beamforming. The third RFIC 226 may include, for example, as a part of the third RFFE 236, a plurality of phase shifters 238 corresponding to the plurality of antenna elements. At the time of transmitting, each of the plurality of phase shifters 238 may convert the phase of a 5G Above6 RF signal to be transmitted to the outside (e.g., base station of 5G network) of the electronic device 101 through the antenna elements corresponding to the phase shifters. At the time of receiving, each of the plurality of phase shifters 238 may convert the phase of a 5G Above6 RF signal, which is received from the outside through the antenna elements corresponding to the phase shifters 238, to be the same or be substantially the same. The phase conversion enables transmission or reception between the electronic device 101 and the outside through beamforming.

The second network 294 (e.g., 5G network) may be operated independently from the first network 292 (e.g., legacy network) (e.g., stand-alone (SA)), or may be operated by being connected therewith (e.g., non-standalone (NSA)). For example, a 5G network may have only an access network (e.g., 5G radio access network (RAN)) or a next generation RAN (NG RAN), and may not have a core network (e.g., next generation core (NGC)). In this case, the electronic device 101 may access the access network of the 5G network and then access an external network (e.g., Internet) under a control of a core network (e.g., evolved packed core (EPC)) of a legacy network. Protocol information (e.g., LTE protocol information) for communicating with a legacy network or protocol information (e.g., new radio (NR) protocol information) for communicating with a 5G network may be stored in the memory 130 and may be accessed by another component (e.g., processor 120, first communication processor 212, or second communication processor 214).

Figure 3:
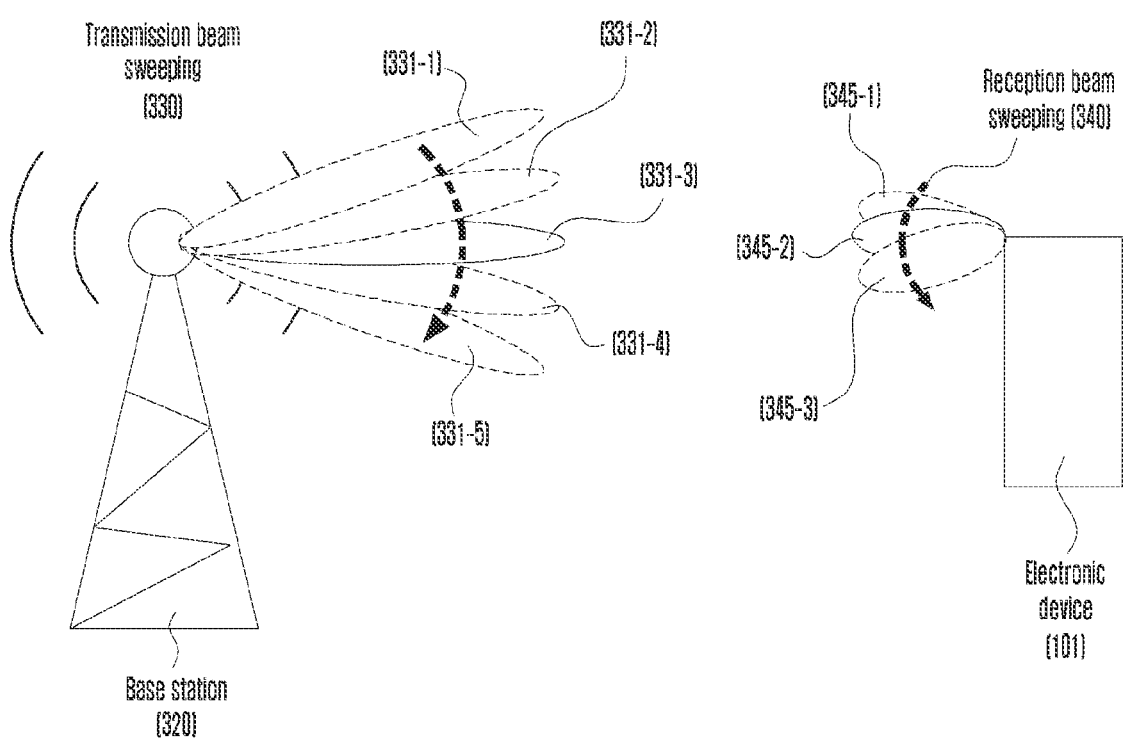
FIG. 3 is a diagram illustrating an example operation for wireless communication connection between a base station and an electronic device in the second network illustrated in FIG. 2, which uses a directional beam for wireless connection according to various embodiments.

FIG. 3 is a diagram illustrating example operation for wireless communication connection between a base station 320 and the electronic device 101 in the second network 294 (e.g., 5G network) illustrated in FIG. 2, which uses a directional beam for wireless connection.

The base station (gNodeB (gNB), transmission reception point (TRP)) 320 may perform a beam detection operation together with the electronic device 101 for the wireless communication connection. In the example embodiment illustrated in FIG. 3, for beam detection, the base station 320 may perform transmission beam sweeping 330 at at least one time by sequentially transmitting a plurality of transmission beams, for example, first to fifth transmission beams 331-1, 331-2, 331-3, 331-4, 331-5 (which may be referred to hereinafter as transmission beams 331-1 to 331-5), which are oriented in different directions.

Each of the first to fifth transmission beams 331-1 to 331-5 may include, for example, at least one synchronization sequences (SS)/physical broadcast channel (PBCH) block (SS/PBCH block). The SS/PBCH block may be used to periodically measure the strength of a channel or a beam of the electronic device 101.

In another embodiment, each of the first to fifth transmission beams 331-1 to 331-5 may include at least one channel state information-reference signal (CSI-RS). A CSI-RS may refer, for example, to a reference signal that may flexibly be configured by the base station 320, and may be transmitted periodically/semi-persistently or aperiodically. The electronic device 101 may measure the intensities of a channel and a beam using the CSI-RS.

The transmission beams may have a radiation pattern having a selected beam width. For example, each of the transmission beams may have a broad radiation pattern having a first beam width, or a sharp radiation pattern having a second beam width smaller than the first beam width. For example, transmission beams including a SS/PBCH block may have a radiation pattern wider than that of transmission beams including a CSI-RS.

The electronic device 101 may perform reception beam sweeping 340 while the base station 320 is performing transmission beam sweeping 330. For example, while the base station 320 is performing first transmission beam sweeping 330, the electronic device 101 may fix a first reception beam 345-1 in a first direction to receive a signal of a SS/PBCH block transmitted by at least one of the first to fifth transmission beams 331-1 to 331-5. While the base station 320 is performing second transmission beam sweeping 330, the electronic device 101 may fix a second reception beam 345-2 in a second direction to receive a signal of a SS/PBCH block transmitted by the first to fifth transmission beams 331-1 to 331-5. While the base station 320 is performing third transmission beam sweeping 330, the electronic device 101 may fix a third reception beam 345-3 in a third direction to receive a signal of a SS/PBCH block transmitted by the first to fifth transmission beams 331-1 to 331-5. As described above, the electronic device 101 may select a communication-enabled reception beam (e.g., second reception beam 345-2) and a communication-enabled transmission beam (e.g., third transmission beam 331-3), based on a result of a signal receiving operation through reception beam sweeping 340.

Based on the communication-enabled transmission/reception beams being determined, the base station 320 and the electronic device 101 may transmit and/or receive pieces of basic information for cell configuration and configure information for additional beam management, based on the pieces of basic information. For example, the beam management information may include detailed information of a configured beam, and configuration information of a SS/PBCH block, CSI-RS, or additional reference signal.

In addition, the electronic device 101 may consistently monitor the intensities of a channel and a beam using at least one of a SS/PBCH block and a CSI-RS included in a transmission beam. The electronic device 101 may adaptively select a beam having good quality using the monitoring operation. If the electronic device 101 is moved or beams are blocked whereby communication is disconnected, the beam sweeping operation may be re-performed to determine a communication-enabled beam.

Figure 4:
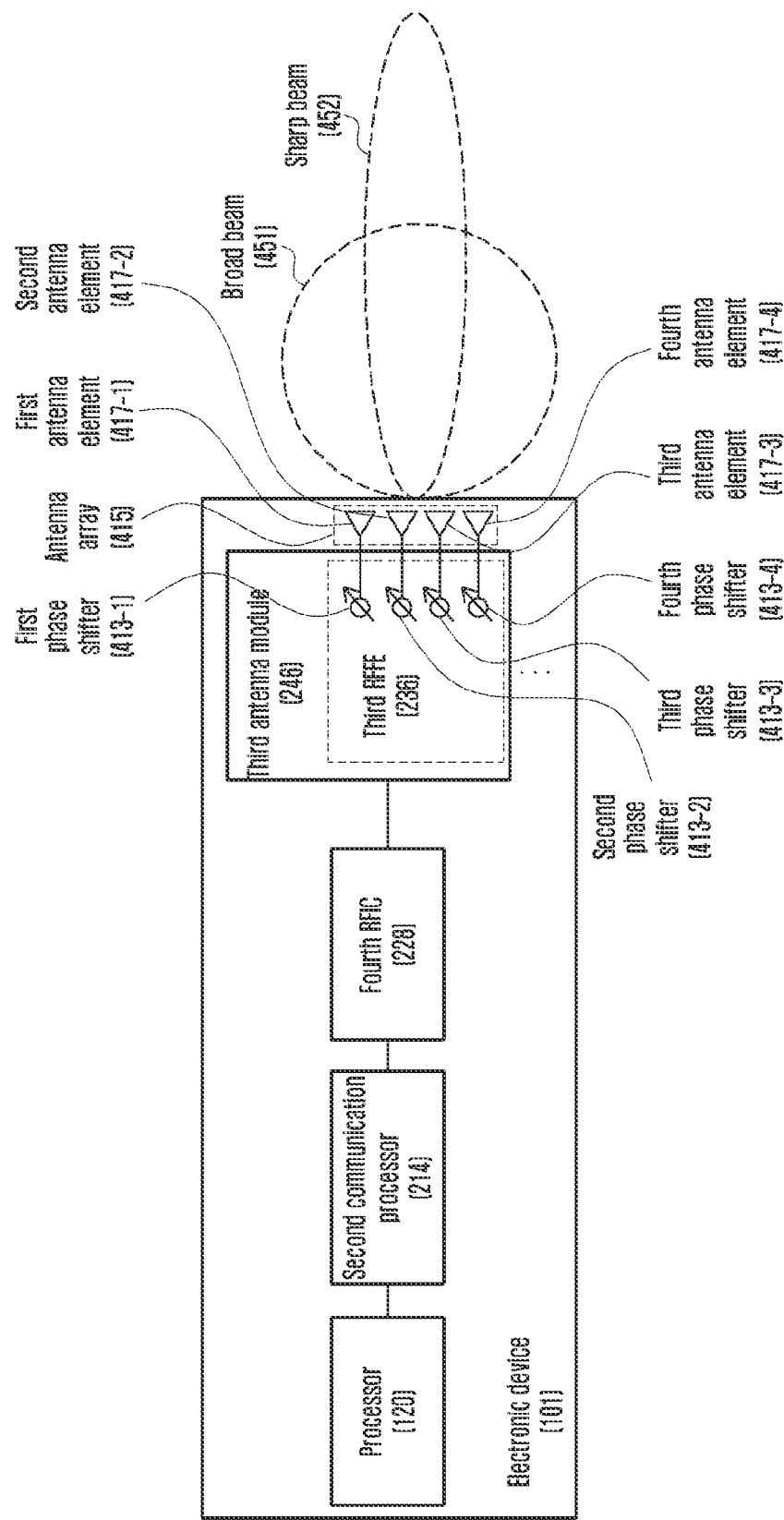
FIG. 4 is a block diagram illustrating an example electronic device for 5G network communication according to various embodiments.

FIG. 4 is a block diagram illustrating an example electronic device 101 for 5G network communication according to an embodiment.

The electronic device 101 may include various components illustrated in FIG. 2. However, FIG. 4 illustrates, for a brief description, the electronic device including a processor (e.g., including processing circuitry) 120, a second communication processor (e.g., including processing circuitry) 214, a fourth RFIC 228, and at least one third antenna module 246.

In an embodiment illustrated in FIG. 4, the third antenna module 246 may include first, second, third and fourth phase shifters 413-1, 413-2, 413-3, 413-4 (which may be referred to hereinafter as first to fourth phase shifters 413-1 to 413-4) (e.g., phase shifter 238 illustrated in FIG. 2) and/or first, second, third and fourth antenna elements 417-1, 417-2, 417-3, 417-4 (which may be referred to hereinafter as first to fourth antenna elements 417-1 to 417-4) (e.g., antenna 248 illustrated in FIG. 2). Each of the first to fourth antenna elements 417-1 to 417-4 may electrically be connected to each of the first to fourth phase shifters 413-1 to 413-4. The first to fourth antenna elements 417-1 to 417-4 may form at least one antenna array 415.

The second communication processor 214 may include various processing circuitry and control the first to fourth phase shifters 413-1 to 413-4 to control the phases of signals transmitted and/or received through the first to fourth antenna elements 417-1 to 417-4 and accordingly generate a transmission beam and/or a reception beam in a selected direction.

According to an embodiment, the third antenna module 246 may generate a broad radiation pattern beam 451 (hereinafter, "broad beam") or a sharp (e.g., relatively narrower than the broad beam) radiation pattern beam 452 (hereinafter, "sharp beam") as described above, according to the number of the used antenna elements. For example, the third antenna module 246 may generate a sharp beam 452 using all of the first to fourth antenna elements 417-1 to 417-4, and may generate a broad beam 451 using only the first antenna element 417-1 and the second antenna element 417-2. The broad beam 451 may have a wider coverage than the sharp beam 452 but has a smaller antenna gain than the sharp beam 452 and thus can be more effectively used for beam searching. On the other hand, the sharp beam 452 may have a narrower coverage than the broad beam 451 but a higher antenna gain than the broad beam 451 and thus can improve communication performance.

According to an embodiment, the second communication processor 214 may include various processing circuitry and may utilize a sensor module 176 (e.g., 9-axis sensor, grip sensor, or GPS) for beam searching. For example, the electronic device 101 may use the sensor module 176 to adjust a beam searching location and/or a beam searching cycle, based on a location and/or a movement of the electronic device 101. According to another example, if the electronic device 101 is held by a user, a grip sensor is used to identify the portion held by the user, whereby an antenna module having better communication performance among a plurality of third antenna modules 246 may be selected.

Figure 5A:
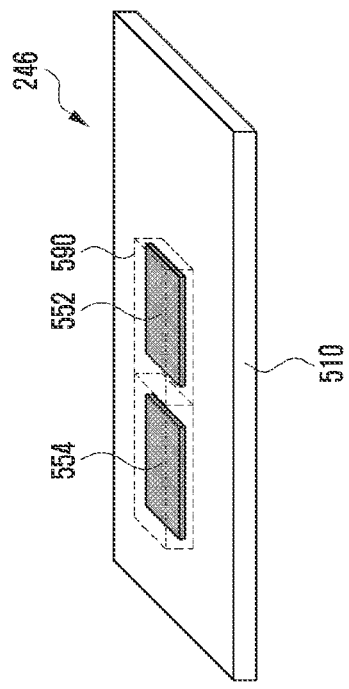
FIG. 5A is a diagram illustrating an example structure of an antenna module according to various embodiments.
Figure 5B:
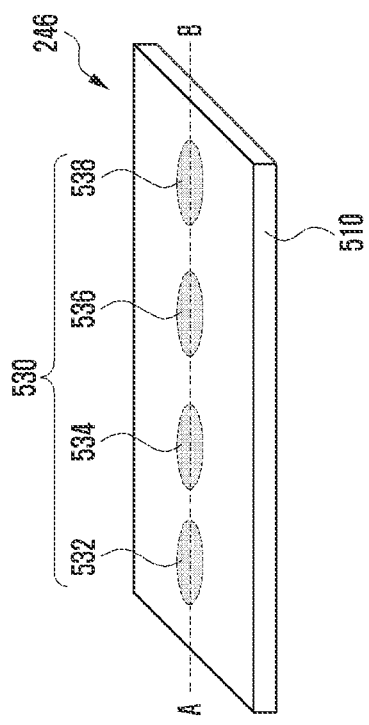
FIG. 5B is a diagram illustrating an example structure of an antenna module according to various embodiments.
Figure 5C:
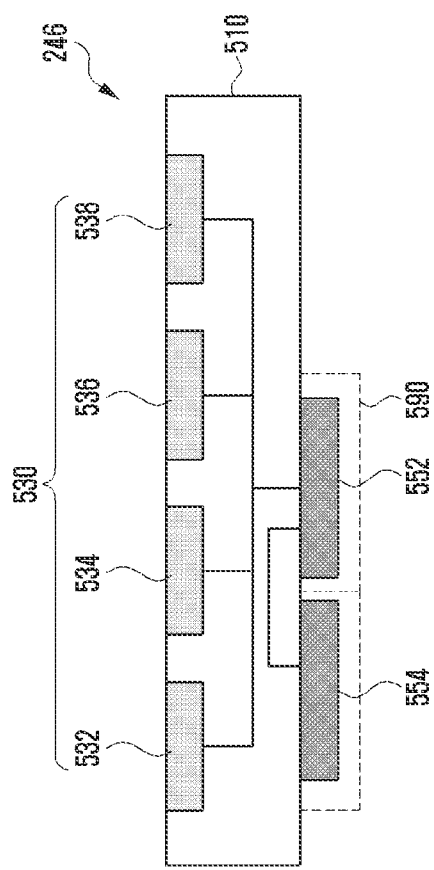
FIG. 5C is a diagram illustrating an example structure of an antenna module according to various embodiments.

FIG. 5A is a diagram illustrating an example structure of an antenna module according to various embodiments, FIG. 5B is a diagram illustrating an example structure of an antenna module according to various embodiments, and FIG. 5C is a diagram illustrating an example structure of an antenna module according to various embodiments.

For example, FIGS. 5A, 5B, and 5C illustrate an example embodiment of an example structure of the third antenna module 246 described above with reference to FIG. 2. FIG. 5A is a perspective view of the third antenna module 246 viewed from one side thereof, and FIG. 5B is a perspective view of the third antenna module 246 viewed from another side thereof. FIG. 5C is a cross-sectional view taken along line A-B of the third antenna module 246.

Referring to FIGS. 5A, 5B, and 5C, in an embodiment, the third antenna module 246 may include a printed circuit board 510, an antenna array 530 including various antenna elements, a radio frequency integrated circuit (RFIC) 552, and a power management integrated circuit (PMIC) 554. The third antenna module 246 may further include a shielding member 590. According to other embodiments, at least one of the aforementioned components may be omitted, or at least two of the components may be integrally configured.

The printed circuit board 510 may, for example, include a plurality of conductive layers and a plurality of nonconductive layers stacked alternately with the conductive layers. The printed circuit board 510 may electrically connect various electronic components disposed on the printed circuit board 510 and/or the outside thereof using wires and conductive vias disposed in the conductive layers.

The antenna array 530 (e.g., antenna 248 illustrated in FIG. 2) may include a plurality of antenna elements 532, 534, 536, and 538 (e.g., antennas) disposed to generate a directional beam. The antenna elements 532, 534, 536, and 538 may be disposed on a first surface of the printed circuit board 510 as illustrated. According to another embodiment, the antenna array 530 may be disposed in the printed circuit board 510. According to embodiments, the antenna array 530 may include a plurality of antenna arrays (e.g., dipole antenna array and/or patch antenna array) having an identical shape or different shapes and an identical type or different types.

The RFIC 552 (e.g., third RFIC 226 illustrated in FIG. 2) may be disposed in another area (e.g., second surface opposite to first surface) of the printed circuit board 510, spaced apart from the antenna array. The RFIC 552 may be configured to process a signal having a selected frequency band, which is transmitted/received through the antenna array 530. According to an embodiment, at the time of transmitting, the RFIC 552 may convert a baseband signal acquired from a communication processor (e.g., second communication processor 214 illustrated in FIG. 2), into a RF signal having a designated band. At the time of receiving, the RFIC 552 may convert a RF signal received through the antenna array 530, into a baseband signal and then transfer the baseband signal to the communication processor.

According to another embodiment, at the time of transmitting, the RFIC 552 may upconvert an IF signal (e.g., about 9 GHz-11 GHz) acquired from an intermediate frequency integrated circuit (IFIC) (e.g., fourth RFIC 228 illustrated in FIG. 2) into a RF signal having a selected band. At the time of receiving, the RFIC 552 may downconvert a RF signal acquired through the antenna array 530, into an IF signal and then transfer the IF signal to the IFIC.

The PMIC 554 may be disposed in another partial area (e.g., the second surface) of the printed circuit board 510, spaced apart from the antenna array 530. The PMIC 554 may be supplied with voltage from a main circuit board (main PCB, not illustrated) and then provide required power to various components (e.g., RFIC 552) on the antenna module.

The shielding member 590 may be disposed on a part (e.g., the second surface) of the printed circuit board 510 to electromagnetically shield at least one of the RFIC 552 or the PMIC 554. According to an embodiment, the shielding member 590 may include a shield can.

Although not illustrated, according to various embodiments, the third antenna module 246 may be electrically connected to another printed circuit board (e.g., main circuit board) through a module interface. The module interface may include a connection member, for example, a coaxial cable connector, a board to board (B2B) connector, an interposer, or a flexible printed circuit board (FPCB). The RFIC 552 and/or the PMIC 554 of the antenna module 246 may be electrically connected to the printed circuit board 510 through the connection member.

Figure 6:
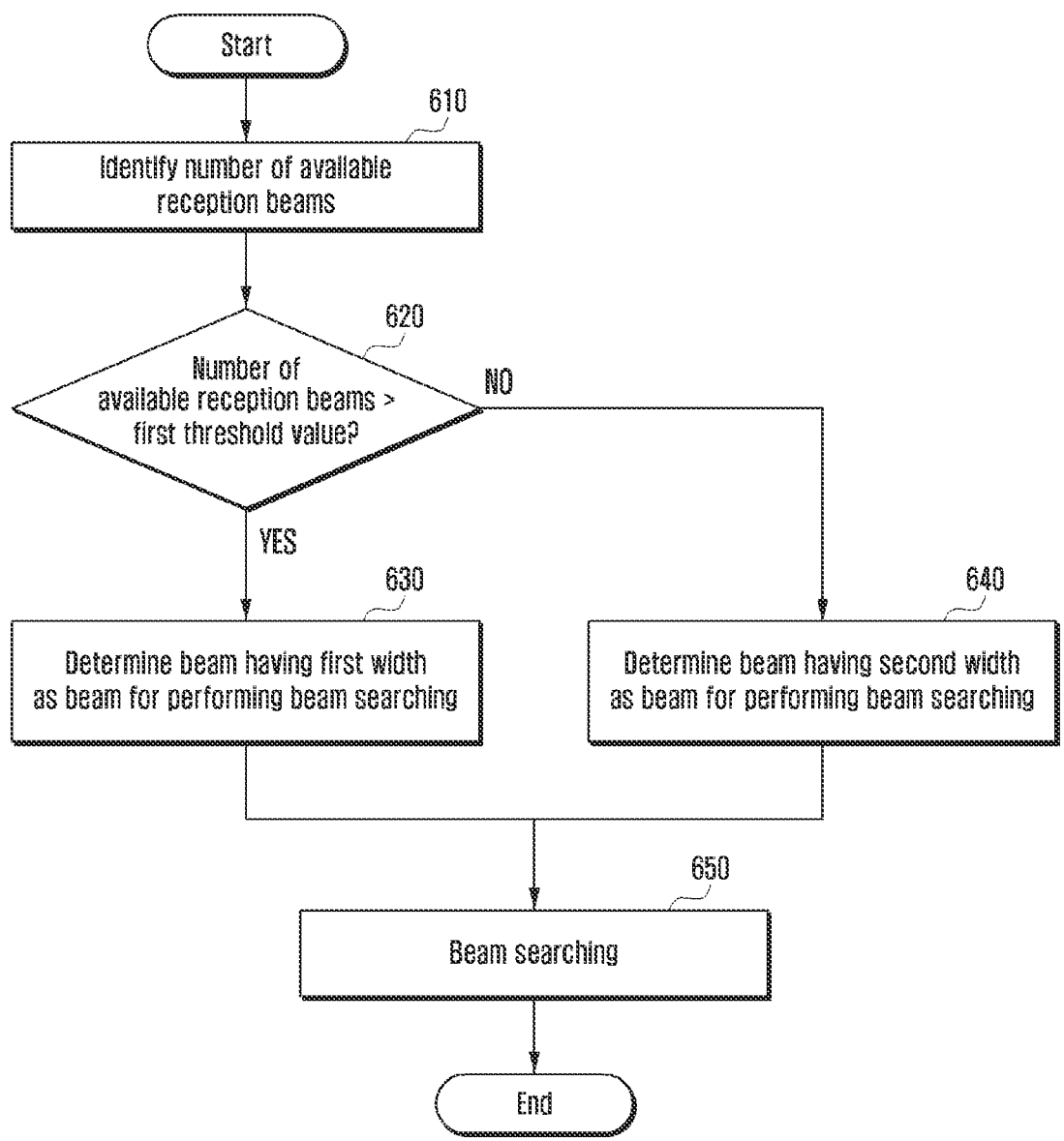
FIG. 6 is a flowchart illustrating an example beam searching method according to various embodiments.

FIG. 6 is a flowchart illustrating an example beam searching method according to an embodiment.

According to an embodiment, operations 610, 620, 630, 640 and 650 may be performed, for example, through one or more of an electronic device (e.g., electronic device 101 illustrated in FIG. 1), a processor (e.g., processor 120 illustrated in FIG. 1) of the electronic device 101, a wireless communication module (e.g., wireless communication module 192 illustrated in FIG. 1) of the electronic device 101.

According to an embodiment, in operation 610, the electronic device 101 may identify the number of reception beams that can be used by the electronic device 101. For example, operation 610 may be performed after the electronic device 101 is powered on. After being powered on, the electronic device 101 may perform beam searching to determine a frequency band to access, and may determine a width of a beam to be used for beam searching, based on the number of reception beams to be used by the electronic device 101.

According to an embodiment, in operation 620, the electronic device 101 may determine whether the number of available reception beams exceeds a first threshold value. According to an embodiment, the first threshold value may be stored in the memory 130 of the electronic device 101.

According to an embodiment, in operation 620, if it is determined that the number of reception beams that can be used by the electronic device 101 exceeds the first threshold value (e.g., "YES" for operation 620), the electronic device 101 may determine, as a beam for performing beam searching, a beam having a first width in operation 630. According to an embodiment, the electronic device 101 may perform beam searching using a beam having the first width or a second width. According to an embodiment, a beam having the first width may have a wider beam width than a beam having the second width. According to various embodiments, if frequency scanning is performed using a beam having the first width, a time required for beam searching may be reduced as compared to the case where frequency scanning is performed using a beam having the second width.

According to an embodiment, in operation 650, the electronic device 101 may perform beam searching using a beam having the first width determined through operation 630. According to an embodiment, the electronic device 101 may identify a signal for synchronization through operation 650.

According to an embodiment, in operation 620, if it is determined that the number of reception beams that can be used by the electronic device 101 is equal to or smaller than the first threshold value (e.g., "NO" for operation 620), the electronic device 101 may determine, as a beam for performing beam searching, a beam having the second width in operation 640. According to an embodiment, a beam having the second width may have a narrower beam width than a beam having the first width.

According to an embodiment, in operation 650, the electronic device 101 may perform beam searching using a beam having the second width determined through operation 640. According to an embodiment, the electronic device 101 may identify a signal for synchronization through operation 650.

Figure 7:
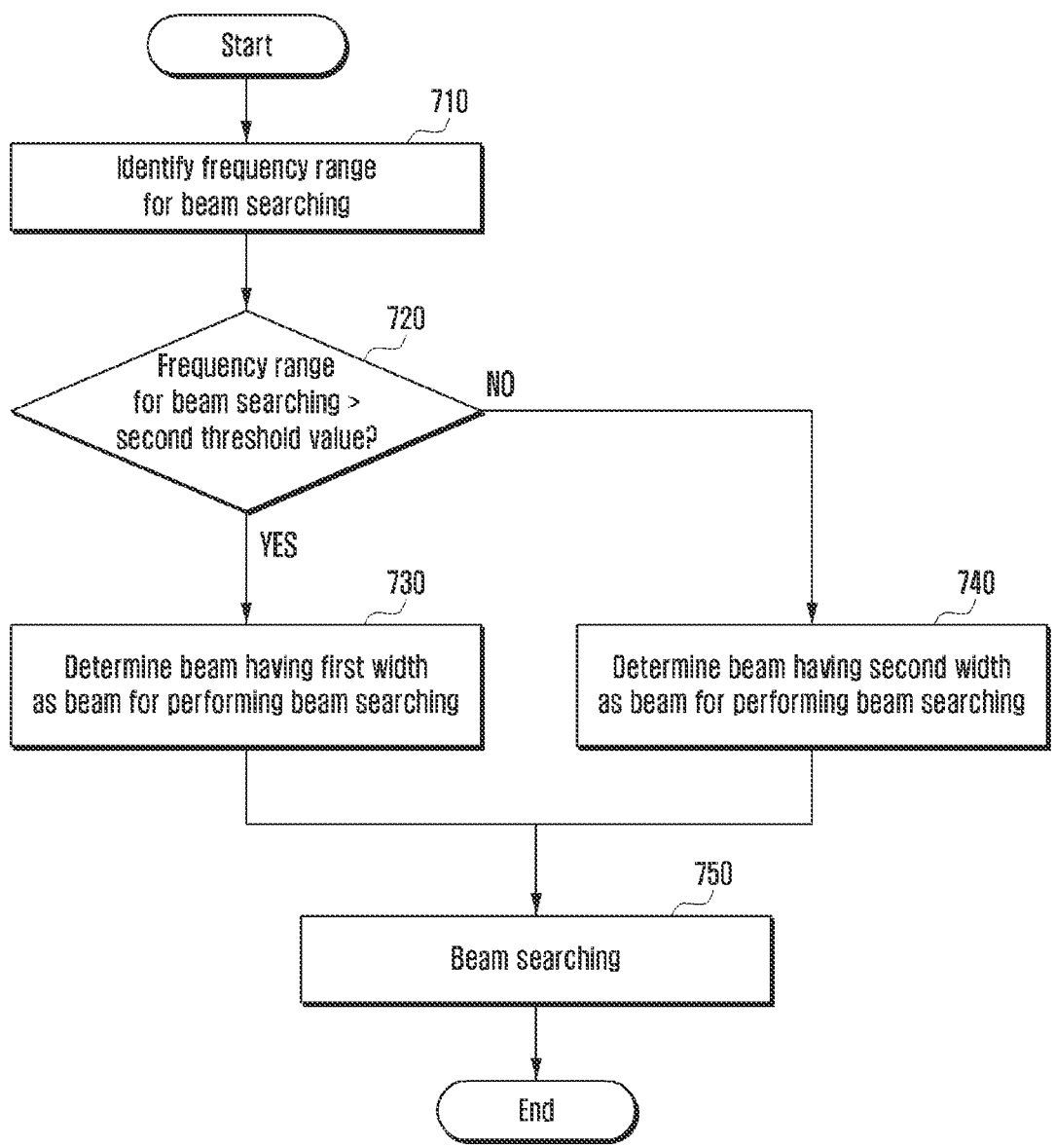
FIG. 7 is a flowchart illustrating an example beam searching method according to various embodiments.

FIG. 7 is a flowchart illustrating an example beam searching method according to an embodiment.

According to an embodiment, operations 710, 720, 730, 740 and 750 may be performed, for example, through one or more of an electronic device (e.g., electronic device 101 illustrated in FIG. 1), a processor (e.g., processor 120 illustrated in FIG. 1) of the electronic device 101, a wireless communication module (e.g., wireless communication module 192 illustrated in FIG. 1) of the electronic device 101.

According to an embodiment, beam searching may be an operation of searching, by the electronic device 101, an identified frequency range to identify whether a target radio access technology (RAT) signal is actually received. According to an embodiment, a transmission beam of a base station configured to transmit a signal may be designated to have different directions for bandwidths obtained by dividing the total bandwidth provided by the base station into a predetermined size. For example, if the electronic device 101 performs beam searching, the number of beams that the electronic device 101 should search for may be obtained by multiplying the number of the divided bandwidths and the number of transmission beams of the base station. Therefore, if a frequency range is wide, a time required for the electronic device to perform beam searching may increase.

According to an embodiment, in operation 710, the electronic device 101 may identify a frequency range for beam searching. For example, operation 710 may be performed after the electronic device 101 is powered on. After being powered on, the electronic device 101 may perform beam searching to determine a frequency band to access, and may determine a width of a beam for performing the beam searching, based on a frequency range for which the beam searching is to be performed.

According to an embodiment, in operation 720, the electronic device 101 may determine whether the frequency range for beam searching exceeds a second threshold value. According to an embodiment, the second threshold value may be stored in the memory 130 of the electronic device 101.

According to an embodiment, in operation 720, if it is determined that the frequency range for beam searching exceeds the second threshold value (e.g., "YES" for operation 720), the electronic device 101 may determine, as a beam for performing beam searching, a beam having a first width in operation 730.

According to an embodiment, in operation 720, if it is determined that the frequency range for beam searching is equal to or smaller than the second threshold value (e.g., "NO" for operation 720), the electronic device 101 may determine, as a beam for performing beam searching, a beam having a second width in operation 740. A beam having the first width may have a wider beam width than a beam having the second width.

According to an embodiment, in operation 750, the electronic device 101 may perform beam searching using a beam having a beam width determined through operation 730 or 740. According to an embodiment, the electronic device 101 may identify a signal for synchronization through operation 750.

Figure 8:
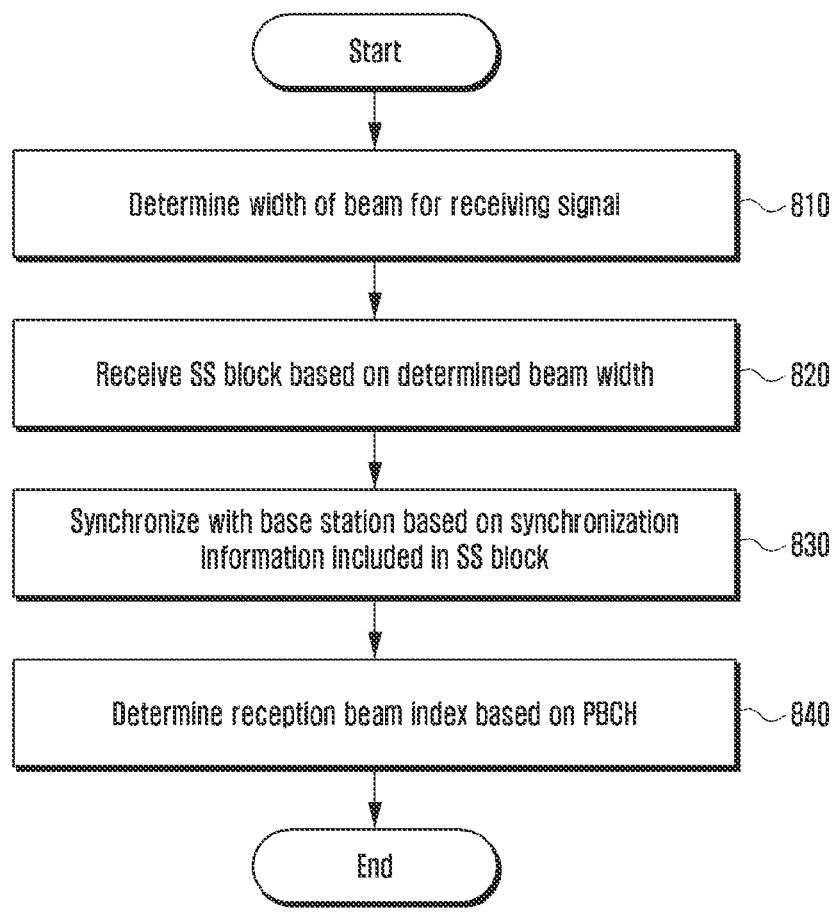
FIG. 8 is a flowchart illustrating an example beam searching method according to various embodiments.

FIG. 8 is a flowchart illustrating an example beam searching method according to an embodiment.

According to an embodiment, operations 810, 820, 830 and 840 may be performed, for example, through one or more of an electronic device (e.g., electronic device 101 illustrated in FIG. 1), a processor (e.g., processor 120 illustrated in FIG. 1) of the electronic device 101, a wireless communication module (e.g., wireless communication module 192 illustrated in FIG. 1) of the electronic device 101.

According to an embodiment, in operation 810, the electronic device 101 may determine a width of a beam for receiving a signal transmitted by a base station. For example, the electronic device 101 may determine whether the signal strength of a beam transmitted by the base station exceeds a third threshold value. According to an embodiment, the third threshold value may be stored in the memory 130 of the electronic device 101. According to an embodiment, the electronic device 101 may determine the signal strength of a transmission beam transmitted by the base station, the determining being based on an accumulated primary synchronization signal (PSS) value or an automatic gain control (AGC) value of frequency according to a previously performed beam searching procedure.

According to an embodiment, an AGC may refer, for example, to an operation of measuring a reception signal level to configure a gain such that the reception signal level reaches a target value. For example, if a gain table is made by mapping gain values to reception signal levels through an AGC, a current reception signal strength may be obtained through a gain value.

According to various embodiments, an accumulated PSS value may refer, for example, to the sum of PSS values detected in a predetermined time window period, which is configured. For example, the signal intensity may be measured using the sum of signal components having been received through multiple paths of a PSS.

According to an embodiment, if the signal strength of a transmission beam of the base station exceeds the third threshold value, the electronic device 101 may determine, as a beam for beam searching, a beam having a first width. According to an embodiment, if the signal strength of a transmission beam of the base station is equal to or smaller than the third threshold value, the electronic device 101 may determine, as a beam for beam searching, a beam having a second width. According to an embodiment, a beam having the first width may have a wider beam width than a beam having the second width.

According to an embodiment, in operation 820, the electronic device 101 may receive a first synchronization signal (SS) block from the base station, based on a determined beam width. According to various embodiments, the electronic device 101 may detect a PSS through operation 820. According to an embodiment, the PSS may indicate a first synchronization signal required for synchronization between the electronic device 101 and the base station, and the PSS may be transmitted to the electronic device 101 after being included in a SS block transmitted by the base station. According to an embodiment, the base station may transmit a SS burst or a SS block set including a plurality of SS blocks to the electronic device 101.

According to an embodiment, the electronic device 101 may determine whether a time interval passed after the SS block is received exceeds a designated time interval (e.g., about 20 ms). According to an embodiment, a cycle by which the base station transmits an SS burst to the electronic device 101 may be about 20 ms. According to an embodiment, the transmission cycle of the SS burst may be transmitted by the base station to the electronic device 101 through RRC signaling.

According to an embodiment, if the electronic device 101 determines that a time interval passed after the SS block is received exceeds a designated time interval (e.g., about 20 ms) (or, the time interval exceeds the transmission cycle of the SS burst), the electronic device may determine whether the number of reception beams received from the base station satisfies a first reference value. According to an embodiment, the first reference value may be the number of reception beams required for beam searching. According to various embodiments, if the number of the reception beams is equal to or smaller than the first reference value, the electronic device 101 may consistently detect a PSS until the number of the reception beams satisfies the first reference value.

According to an embodiment, in operation 830, the electronic device 101 may synchronize with the base station, based on synchronization information included in the SS block. For example, the electronic device 101 may detect a PSS and a secondary synchronization signal (SSS) through reception of the SS block. According to various embodiments, the electronic device 101 may synchronize with the base station using detected PSS and SSS.

According to an embodiment, the electronic device 101 may detect a PSS and a SSS and obtain a cell ID, based on the detected PSS and SSS. According to an embodiment, the base station may include a plurality of cells, and the electronic device 101 may obtain, based on the detected PSS and SSS, the ID of a cell, which the electronic device tries to access.

According to an embodiment, the electronic device 101 may measure a reference signal received power (RSRP) of a reference signal. For example, the reference signal may be included in a SS block, and the electronic device 101 may estimate, based on a measured RSRP, the state of a channel between the base station and the electronic device. According to various embodiments, the electronic device 101 may decode a physical broadcasting channel (PBCH), based on the estimated channel state. According to an embodiment, the PBCH may be included in the SS block. According to various embodiments, the electronic device 101 may obtain a master information block (MIB) for connection with the base station by decoding the PBCH.

According to an embodiment, in operation 840, the electronic device 101 may obtain (e.g., determine) a reception beam index, based on the decoded PBCH. For example, the electronic device 101 may determine, based on the obtained beam index, an index of a beam, among beams generated for reception of a signal transmitted by the base station, which is most suitable.

Figure 9:
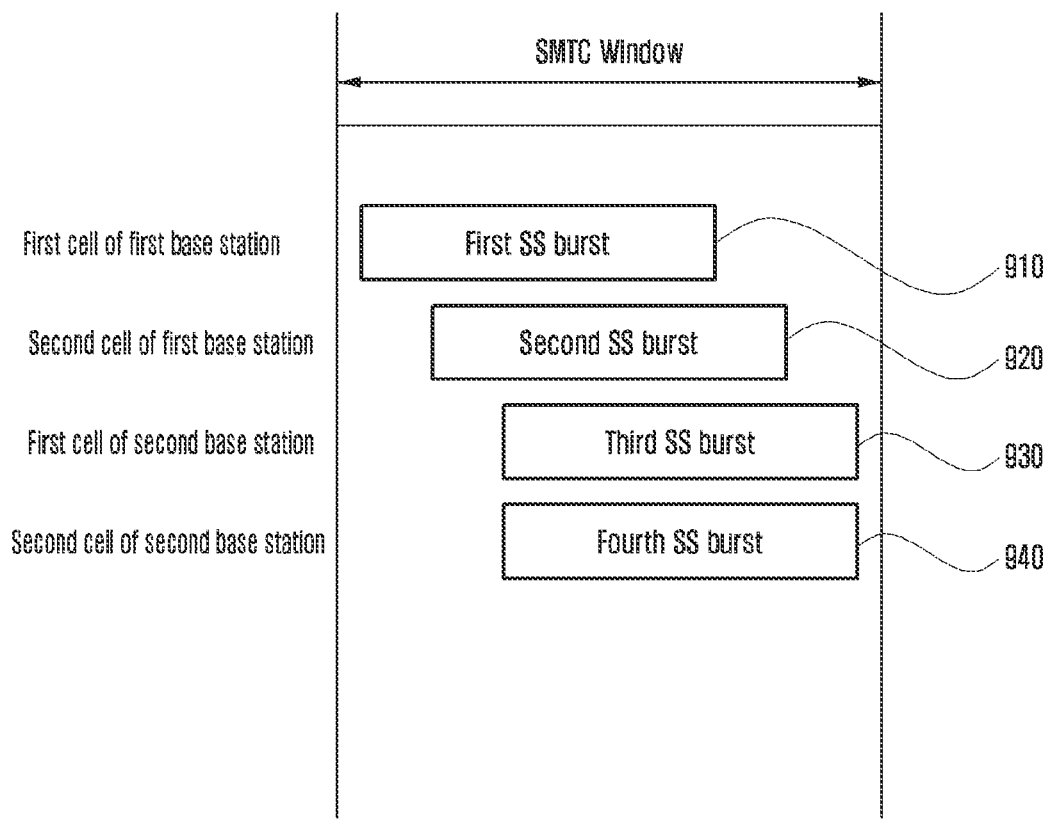
FIG. 9 is a diagram illustrating an example in which SS bursts corresponding to a plurality of cells are received from the cells during a SMTC window according to various embodiments.

FIG. 9 is a diagram illustrating an example in which SS bursts corresponding to a plurality of cells are received from the cells during a SMTC window according to an embodiment.

According to an embodiment, one base station may include a plurality of cells. According to an embodiment, the electronic device 101 may receive SS bursts corresponding to a plurality of cells from the cells included in one base station. According to an embodiment, a plurality of base stations may transmit a plurality of SS bursts.

According to an embodiment, as illustrated in FIG. 9, the electronic device 101 may receive four SS bursts within a SS/PBCH block measurement time configuration (SMTC) window. According to an embodiment, each of the SS bursts may include at least one SS block. According to an embodiment, each of SS blocks included in the SS burst may include a PSS, a SSS, a PBCH, and a PBCH-demodulation reference signal (PBCH-DMRS).

According to an embodiment, a single SS block may correspond to a single beam. For example, if there are four beams in a first cell, there may be four SS blocks corresponding to the beams in a first SS burst 910. According to various embodiments, the electronic device 101 may receive SS blocks corresponding to beams to measure the signal strengths of beams.

According to an embodiment, the electronic device 101 may receive a first SS burst 910 from a first cell of a first base station, a second SS burst 920 from a second cell of the first base station, a third SS burst 930 from a first cell of a second base station, and a fourth SS burst 940 from a second cell of the second base station.

According to an embodiment, the first SS burst 910, the second SS burst 920, the third SS burst 930, or the fourth SS burst 940 may have duration of a designated time interval (e.g., about 5 ms). According to an embodiment, the SMTC window may be configured to be longer than about 5 ms.

According to an embodiment, the electronic device 101 may receive four SS bursts during the pre-configured SMTC window, and the electronic device 101 may simultaneously process the four SS bursts using a plurality of decoders and a plurality of reference signal measuring units.

Figure 10:
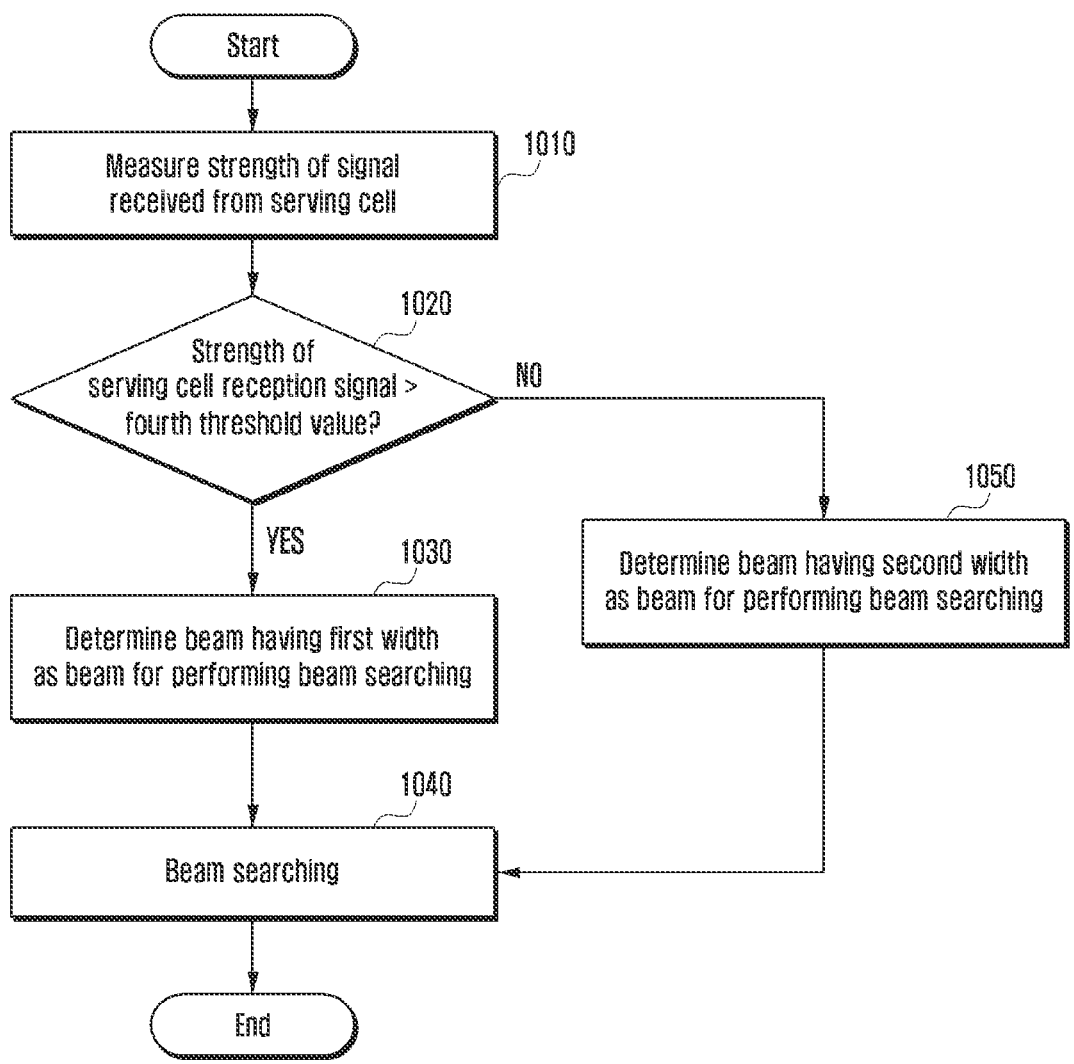
FIG. 10 is a flowchart illustrating an example method of performing, by an electronic device, beam searching in the state where the electronic device is connected to a particular cell according to various embodiments.

FIG. 10 is a flowchart illustrating an example method of performing, by an electronic device, beam searching in the state where the electronic device is connected to a particular cell according to an embodiment.

According to an embodiment, operations 1010, 1020, 1030, 1040 and 1050 may be performed, for example, through one or more of an electronic device (e.g., electronic device 101 illustrated in FIG. 1), a processor (e.g., processor 120 illustrated in FIG. 1) of the electronic device 101, a wireless communication module (e.g., wireless communication module 192 illustrated in FIG. 1) of the electronic device 101.

According to an embodiment, the electronic device 101 may obtain a beam index and determine, based on the obtained beam index, an index of a beam, which is most suitable for communicating with a base station. For example, the electronic device 101 may communicate with a base station by accessing a first cell, based on a beam index obtained through a first SS burst received from the first cell.

According to an embodiment, even while the electronic device 101 is communicating with the first cell, the electronic device may receive a second SS burst from a second cell, and/or may receive a third SS burst from a cell, such as a third cell, which is different from the first cell communicating with the electronic device. According to an embodiment, the second cell and the third cell may belong to base stations different from each other. For example, the first cell and the second cell may be included in a first base station, and the third cell may be included in a second base station.

According to an embodiment, the electronic device 101 using the first cell as a serving cell may perform beam searching on the second cell or the third cell. According to various embodiments, the electronic device 101 may receive SS blocks corresponding to beams through beam searching. For example, the electronic device 101 may receive a plurality of SS blocks corresponding to a plurality of beams of the serving cell and a plurality of SS blocks corresponding to a plurality of beams of an adjacent cell (or neighboring cell) and measure the signal strength of each beam to select an optimal beam for communicating with the base station.

According to an embodiment, in operation 1010, the electronic device 101 may measure the strength of a signal received from a serving cell. According to various embodiments, the electronic device 101 may receive a plurality of SS blocks corresponding to a plurality of beams from the serving cell, and may measure, based on the strength of a plurality of reference signals included in the SS blocks, the signal strengths of the plurality of beams received from the serving cell.

According to an embodiment, in operation 1020, the electronic device 101 may determine whether a signal strength received from the serving cell exceeds a fourth threshold value. According to an embodiment, the fourth threshold value may be stored in the memory 130 of the electronic device 101.

According to an embodiment, in operation 1020, if a signal strength received from the serving cell exceeds the fourth threshold value (e.g., "YES" for operation 1020), the electronic device 101 may determine to perform beam searching through a beam having a first width in operation 1030, and the electronic device 101 may perform beam searching using a beam having the determined first width in operation 1040. For example, the electronic device 101 may perform beam searching on a second cell and a third cell using a beam having the first width.

According to an embodiment, in operation 1020, if a signal strength received from the serving cell is smaller than or equal to the fourth threshold value (e.g., "NO" for operation 1020), the electronic device 101 may determine to perform beam searching through a beam having a second width in operation 1050, and the electronic device 101 may perform beam searching using a beam having the determined second width in operation 1040. According to an embodiment, the first width may be greater than the second width, and a time required for beam searching using a beam having the first width may be shorter than a time required for beam searching using a beam having the second width.

Figure 11:
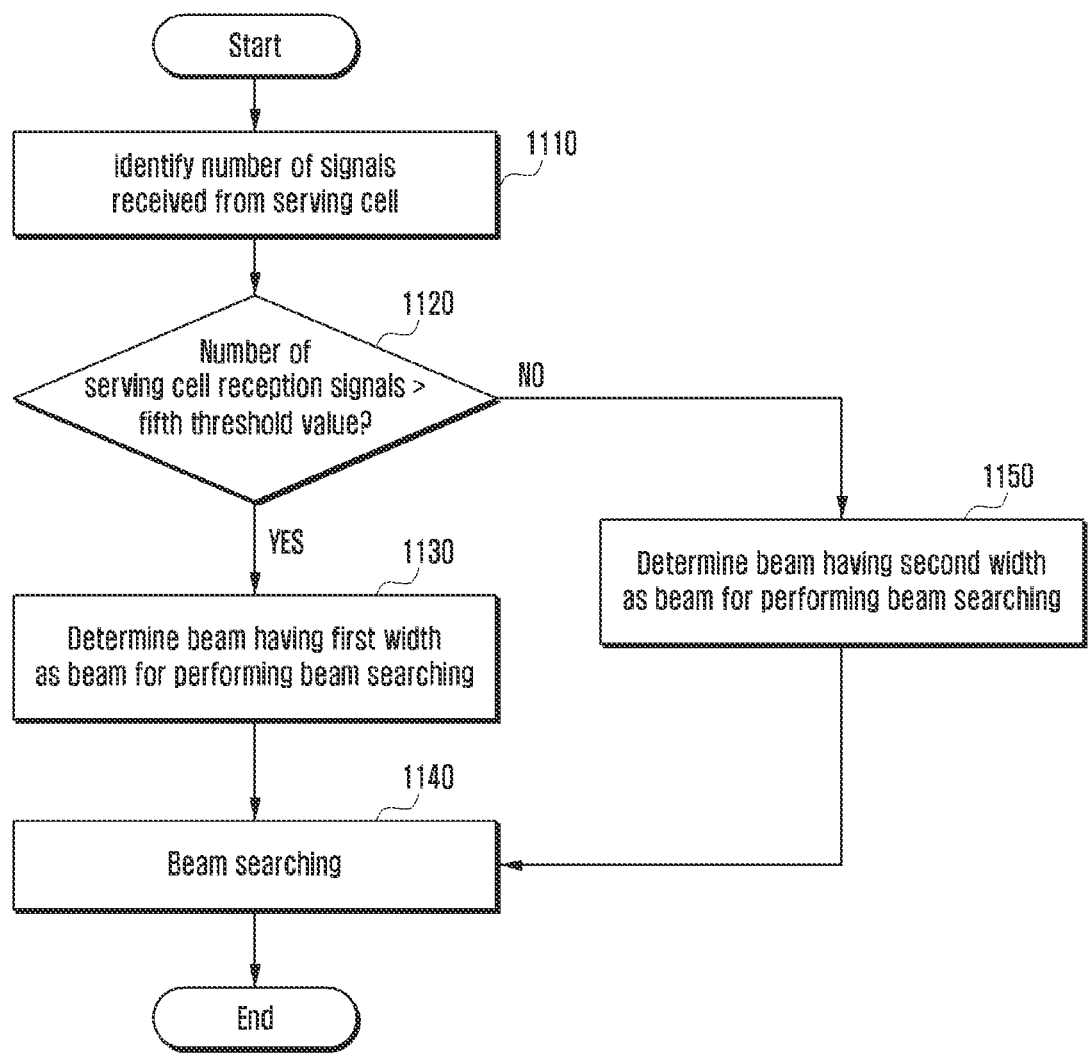
FIG. 11 is a flowchart illustrating an example method of performing, by an electronic device, beam searching in the state where the electronic device is connected to a particular cell according to various embodiments.

FIG. 11 is a flowchart illustrating an example method of performing, by an electronic device, beam searching in the state where the electronic device is connected to a particular cell according to an embodiment.

According to an embodiment, operations 1110, 1120, 1130, 1140 and 1150 may be performed, for example, through one or more of an electronic device (e.g., electronic device 101 illustrated in FIG. 1), a processor (e.g., processor 120 illustrated in FIG. 1) of the electronic device 101, a wireless communication module (e.g., wireless communication module 192 illustrated in FIG. 1) of the electronic device 101.

According to an embodiment, in operation 1110, the electronic device 101 may identify the number of signals received from a serving cell. According to an embodiment, a received signal may include a reference signal, control information or data.

According to an embodiment, in operation 1120, the electronic device 101 may determine whether the number of signals (e.g., serving cell reception signals) received from the serving cell exceeds a fifth threshold value. According to an embodiment, the fifth threshold value may be stored in the memory 130 of the electronic device 101.

According to an embodiment, in operation 1120, if the number of signals received from the serving cell exceeds the fifth threshold value (e.g., "YES" for operation 1120), the electronic device 101 may determine to perform beam searching through a beam having a first width in operation 1130, and the electronic device 101 may perform beam searching using a beam having the determined first width in operation 1140.

According to an embodiment, in operation 1120, if the number of signals received from the serving cell is smaller than or equal to the fifth threshold value (e.g., "NO" for operation 1120), the electronic device 101 may determine to perform beam searching through a beam having a second width in operation 1150, and the electronic device 101 may perform beam searching using a beam having the determined second width in operation 1140. According to an embodiment, the first width may be greater than the second width, and a time required for beam searching using a beam having the first width may be shorter than a time required for beam searching using a beam having the second width.

Figure 12A:
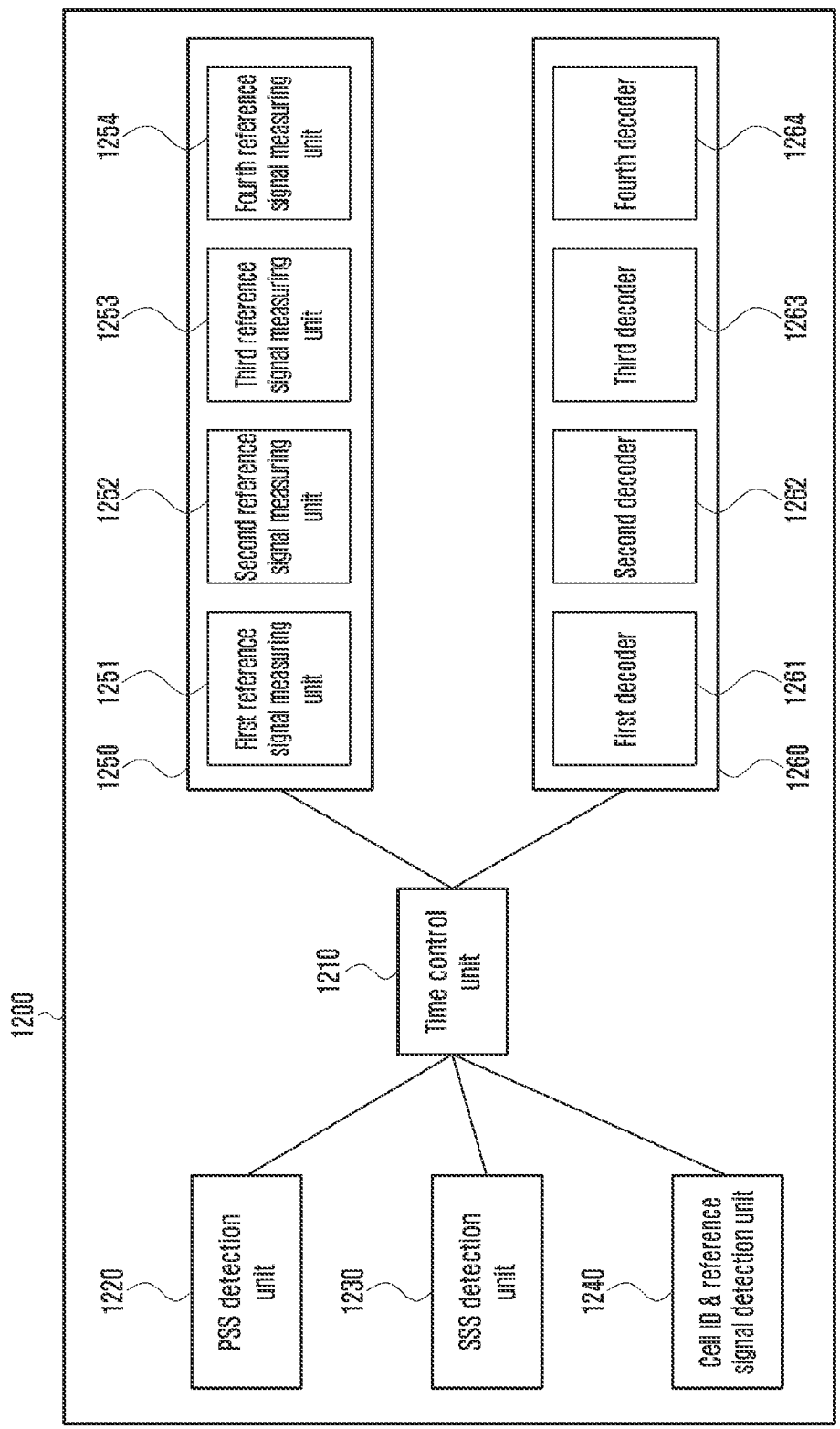
FIG. 12A is a block diagram illustrating an example processor according to various embodiments.

FIG. 12A is a block diagram illustrating an example processor 1200 according to an embodiment.

According to an embodiment, the processor 1200 may include at least one of a time control unit (e.g., including processing circuitry and/or executable program elements) 1210, a PSS detection unit (e.g., including processing circuitry and/or executable program elements) 1220, a SSS detection unit (e.g., including processing circuitry and/or executable program elements) 1230, a cell ID & reference signal detection unit (e.g., including processing circuitry and/or executable program elements) 1240, a reference signal measuring unit (e.g., including processing circuitry and/or executable program elements) 1250, and/or a decoder 1260.

According to an embodiment, the PSS detection unit 1220 may include various processing circuitry and/or executable program elements and detect a PSS included in a received SS block. According to an embodiment, the SSS detection unit 1230 may include various processing circuitry and/or executable program elements and detect an SSS included in a received SS block.

According to various embodiments, the PSS detection unit 1220 and the SSS detection unit 1230 may detect a PSS and an SSS included in a SS block corresponding to each of beams included in a cell. According to an embodiment, the electronic device 101 may synchronize with a base station using a PSS detected through the PSS detection unit 1220 and an SSS detected through the SSS detection unit 1230.

According to an embodiment, the cell ID & reference signal detection unit 1240 may include various processing circuitry and/or executable program elements and receive SS blocks corresponding to beams to detect a cell ID through a PSS and an SSS included in each of the SS blocks. According to various embodiments, the cell ID & reference signal detection unit 1240 may detect reference signals included in SS blocks corresponding to beams, and the electronic device 101 may measure the signal strength of each of the beams through the detected reference signals corresponding to the beams. According to an embodiment, the reference signal may include, for example, and without limitation, a PBCH-DMRS, a channel state information reference signal (CSI-RS), a tracking reference signal (TRS), or the like.

According to an embodiment, the processor may include a plurality of reference signal measuring units each including various processing circuitry and/or executable program elements 1250. For example, if the electronic device 101 tries to measure reference signals received from four cells in order to simultaneously process SS bursts received from the four cells, four reference signal measuring units 1251, 1252, 1253, and 1254 may be arranged, but the disclosure is not limited thereto.

According to various embodiments, a SS burst received from each cell may include a plurality of SS blocks, and SS blocks included in a single SS burst may correspond to beams included in the corresponding cell. According to an embodiment, a first reference signal measuring unit 1251 may measure at least one reference signal transmitted from a first cell, a second reference signal measuring unit 1252 may measure at least one reference signal transmitted from a second cell, a third reference signal measuring unit 1253 may measure at least one reference signal transmitted from a third cell, and a fourth reference signal measuring unit 1254 may measure at least one reference signal transmitted from a fourth cell. According to various embodiments, the first cell, the second cell, the third cell, and the fourth cell may be included in the same base station, or may be included in base stations different from each other.

According to an embodiment, the processor may include a plurality of decoders 1260. According to various embodiments, the electronic device 101 may include, for example, four decoders 1261, 1262, 1263, and 1264 configured to simultaneously decode PBCHs received from the four cells, but the disclosure is not limited thereto.

According to an embodiment, the first decoder 1261 may decode a PBCH transmitted from the first cell, the second decoder 1262 may decode a PBCH transmitted from the second cell, the third decoder 1263 may decode a PBCH transmitted from the third cell, and the fourth decoder 1264 may decode a PBCH transmitted from the fourth cell.

According to an embodiment, the processor 1200 may include a plurality of reference signal measuring units 1250 and a plurality of decoders 1260. According to various embodiments, the electronic device 101 may perform beam management on a plurality of cells during a configured time interval using the plurality of reference signal measuring units 1250 and the plurality of decoders 1260 through the time control unit 1210.

According to an embodiment, the electronic device 101 may track a transmission beam of a serving cell base station while the electronic device is performing reception beam sweeping for beam searching. According to an embodiment, the electronic device 101 may simultaneously track a transmission beam of an adjacent cell (or neighboring cell), as well as a transmission beam of a serving cell, through beam searching using the plurality of reference signal measuring units 1250 and the plurality of decoders 1260.

According to an embodiment, the time control unit 1210 may include various processing circuitry and/or executable program elements and determine on which cell beam management is performed by each of at least two reference signal measuring units 1250 (e.g., first reference signal measuring unit 1251 to fourth reference signal measuring unit 1254) and at least two decoders 1260 (e.g., first decoder 1261 to fourth decoder 1264). For example, the time control unit 1210 may determine that the first reference signal measuring unit 1251 and the first decoder 1261 are used to perform beam management of a serving cell, and the remaining reference signal measuring unit (e.g., second reference signal measuring unit 1252 to fourth reference signal measuring unit 1254) and the remaining decoder (e.g., second decoder 1262 to fourth decoder 1264) are used to perform beam management of an adjacent cell.

According to another embodiment, the second reference signal measuring unit 1252, the third reference signal measuring unit 1253, the fourth reference signal measuring unit 1254, the second decoder 1262, the third decoder 1263, and the fourth decoder 1264 may determine a priority of an adjacent cell to be measured, to perform beam management of the adjacent cell. The electronic device 101 may determine a priority for beam measurement using at least one of a RSRP of each cell, a cell ID, and an order in which cells are discovered (or detected). According to another embodiment, the electronic device 101 may select a random cell without designating a priority for beam measurement separately. According to another embodiment, the electronic device 101 may determine a priority for beam measurement, based on a signal or information transmitted by the base station.

Figure 12B:
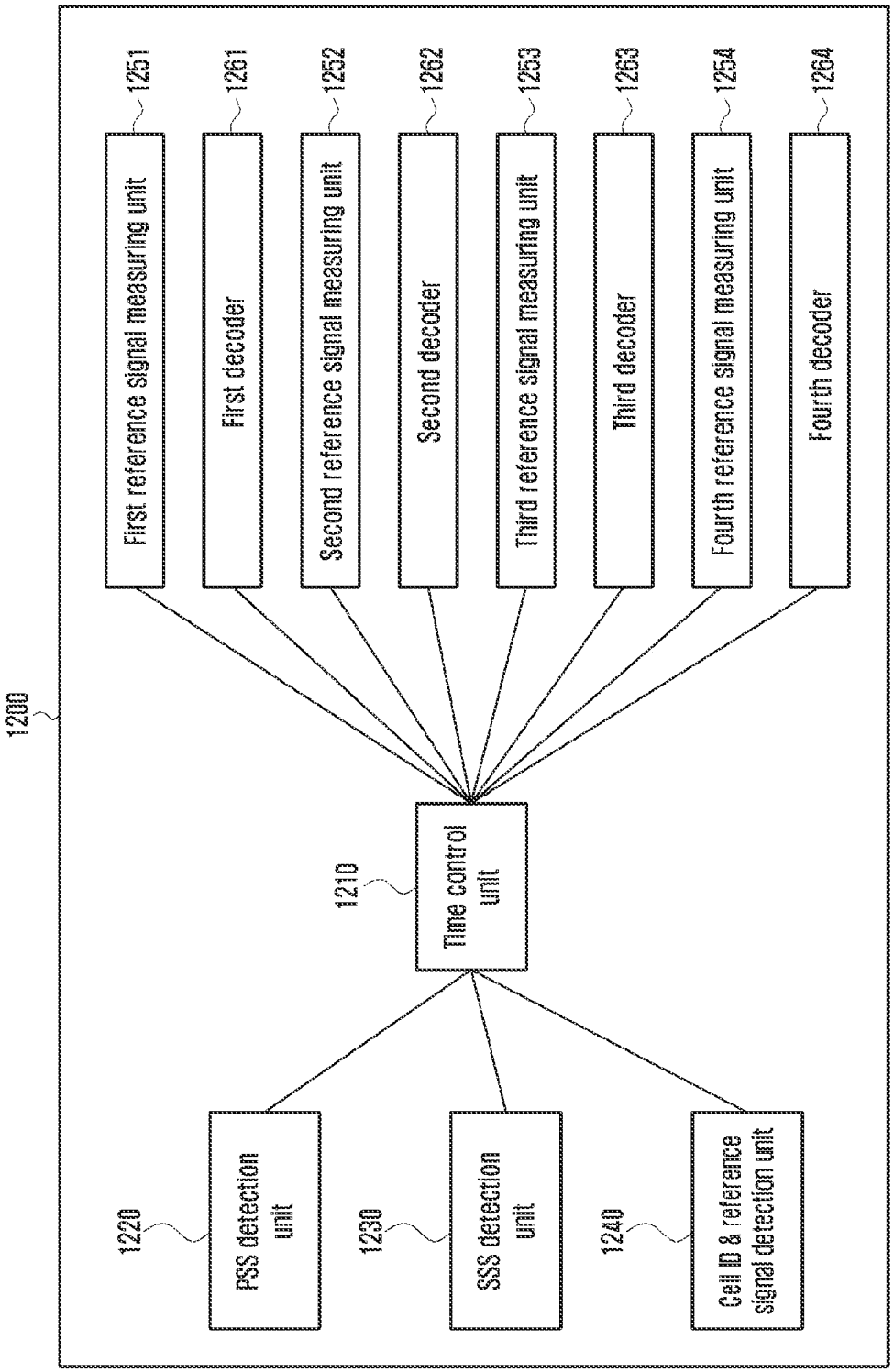
FIG. 12B is a block diagram illustrating an example processor according to various embodiments.

FIG. 12B is a block diagram illustrating an example processor 1200 according to an embodiment.

According to an embodiment, FIG. 12B illustrates that the time control unit 1210 may be directly connected to each of a reference signal measuring unit 1250 (e.g., first reference signal measuring unit 1251 to fourth reference signal measuring unit 1254) and a decoder 1260 (e.g., first decoder 1261 to fourth decoder 1264).

According to an embodiment, the time control unit 1210 may independently operate the reference signal measuring unit 1250 (e.g., first reference signal measuring unit 1251 to fourth reference signal measuring unit 1254) and the decoder 1260 (e.g., first decoder 1261 to fourth decoder 1264) as needed. For example, the time control unit 1210 may selectively operate at least one of the reference signal measuring unit 1250 and the decoder 1260.

According to another embodiment, the time control unit 1210 may allow the reference signal measuring unit 1250 and the decoder 1260 to be operated for different cells, respectively. For example, the time control unit 1210 may simultaneously operate the reference signal measuring unit 1250 and the decoder 1260, or may operate the reference signal measuring unit 1250 and the decoder 1260 with a time gap therebetween.

Figure 12C:
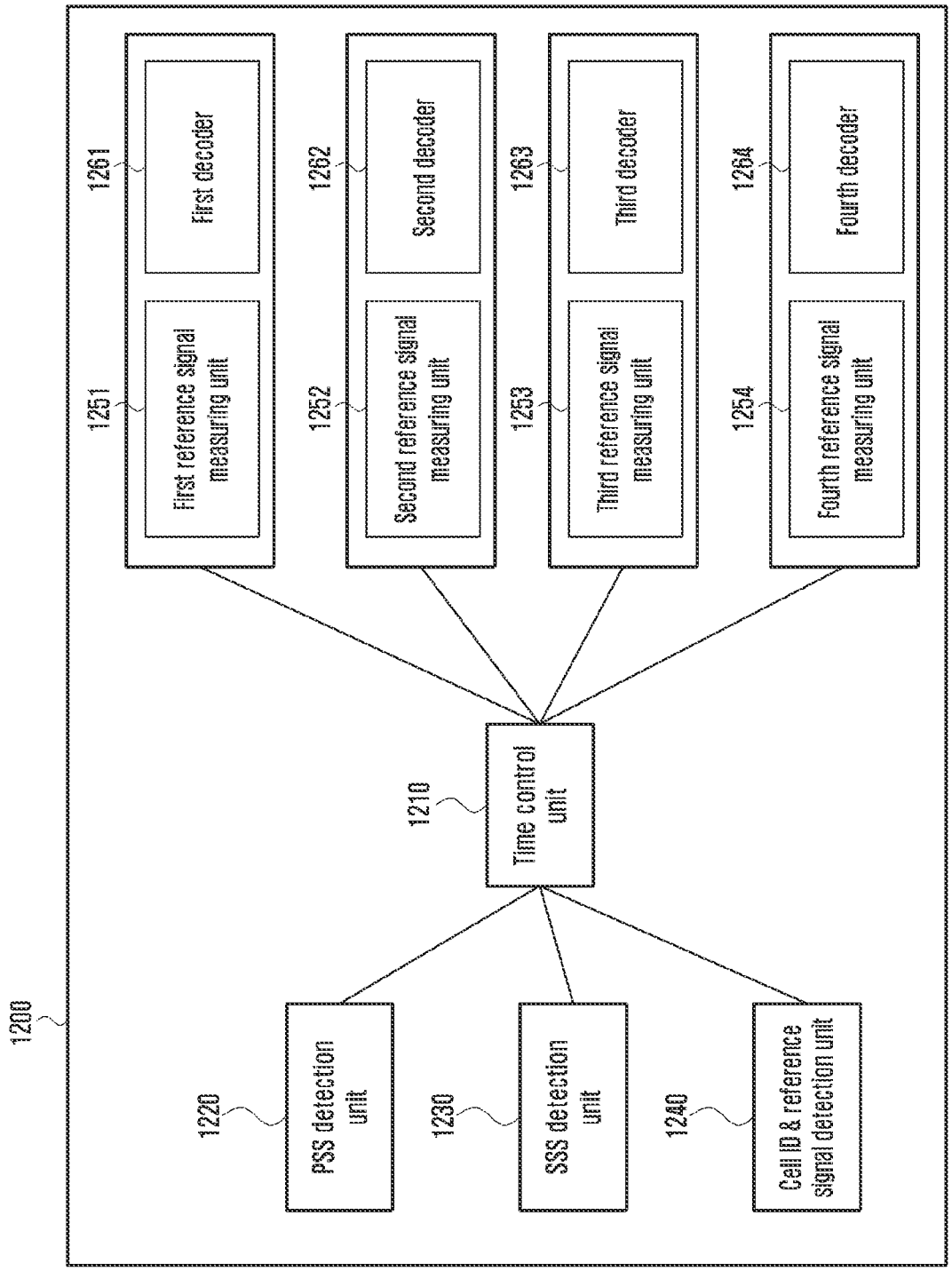
FIG. 12C is a block diagram illustrating an example processor according to various embodiments.

FIG. 12C is a block diagram illustrating an example processor 1200 according to an embodiment.

According to an embodiment, FIG. 12C illustrates that the time control unit 1210 may be connected to a pair of a reference signal measuring unit 1250 (e.g., first reference signal measuring unit 1251 to fourth reference signal measuring unit 1254) and a decoder 1260 (e.g., first decoder 1261 to fourth decoder 1264).

According to an embodiment, the time control unit 1210 may operate, as needed, for example, a pair of a first reference signal measuring unit 1251 and a first decoder 1261, a pair of a second reference signal measuring unit 1252 and a second decoder 1262, a pair of a third reference signal measuring unit 1253 and a third decoder 1263, and a pair of a fourth reference signal measuring unit 1254 and a fourth decoder 1264. For example, the time control unit 1210 may sequentially operate the reference signal measuring unit 1250 and the decoder 1260. According to another embodiment, the time control unit 1210 may allow the reference signal measuring unit 1250 and the decoder 1260 to be operated for different cells, respectively. In addition, the time control unit 1210 may simultaneously operate the reference signal measuring unit 1250 and the decoder 1260, or may operate the reference signal measuring unit and the decoder with a time gap therebetween.

According to various embodiments, if beam measurement is performed on a second cell and a third cell, the first reference signal measuring unit 1251 may measure the second cell at a first particular time point (e.g., time 1), the first reference signal measuring unit 1251 may measure the third cell at a second particular time point (e.g., time 2) (e.g., after time 1), the first decoder 1261 may decode the PBCH value of the measured second cell, and the first decoder 1261 may decode the PBCH value of the measured third cell at a third particular time point (e.g., time 3)(e.g., after time 2).

According to an embodiment, in the examples of FIGS. 12B and 12C, the electronic device 101 includes four reference signal measuring units 1250 and four decoders 1260, but is not limited thereto, and the number of each of reference signal measuring units 1250 and decoders 1260 included in the electronic device 101 may be less than or greater than 4. According to an embodiment, the number of reference signal measuring units 1250 and the number of decoders 1260 may be different from each other. According to an embodiment, as the example illustrated FIG. 12C, the number of reference signal measuring units 1250 and the number of decoders 1260 can be differently mapped in a single pair.

According to an embodiment, if network synchronization is ensured between a serving cell and an adjacent cell, it may be assumed that a SS block index of the serving cell and a SS block index of the adjacent cell are the same. For example, if network synchronization is ensured between a serving cell and an adjacent cell, a PBCH decoding operation may be omitted at the time of beam searching for the adjacent cell.

According to an embodiment, if the electronic device 101 tries to change a reception beam, the electronic device may perform beam searching again to re-obtain timing information of a serving cell and an adjacent cell and measure reference signals of the serving cell and the adjacent cell using the obtained timing information.

According to an embodiment, if the direction of the electronic device 101 is changed, the direction of a beam may be changed, and accordingly timing information between the electronic device 101 and the base station may be required to be changed. According to an embodiment, if timing of a serving cell timing tracker is changed by a reference value or more, the time control unit 1210 may request the processor 1200 to perform beam searching for changing a reception beam.

Figure 13:
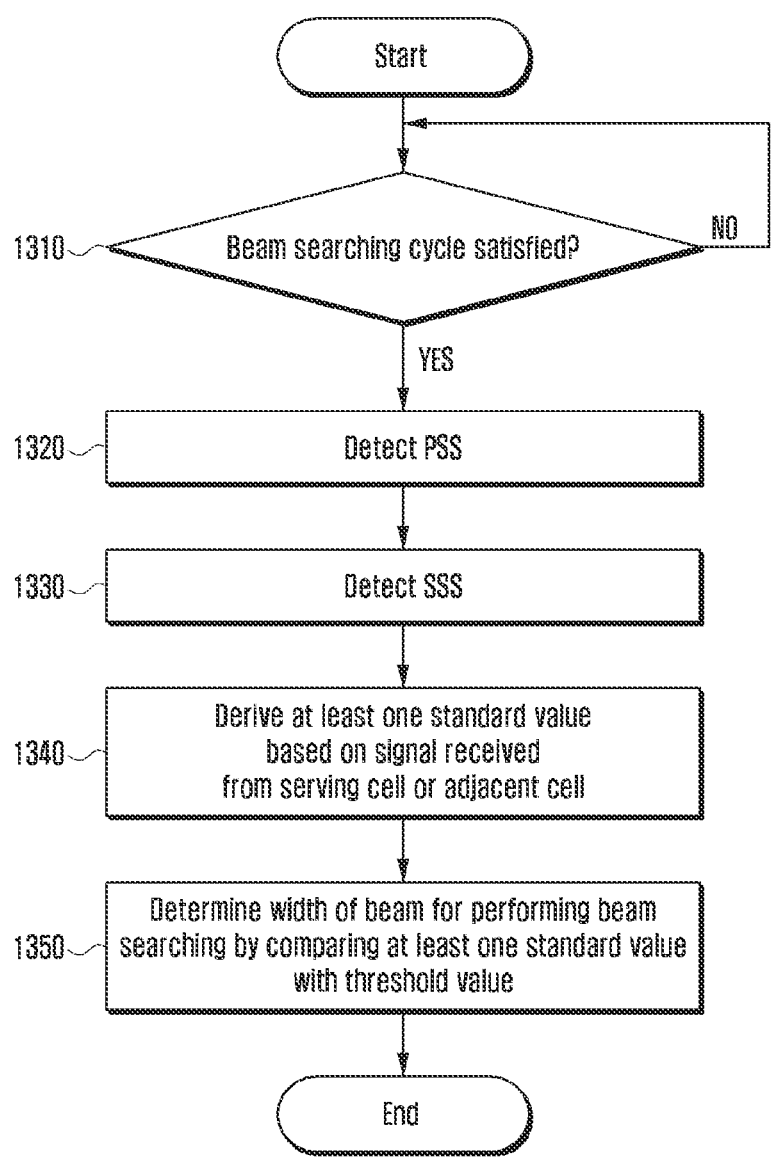
FIG. 13 is a flowchart illustrating an example method of determining the width of a beam for performing beam searching according to various embodiments.

FIG. 13 is a flowchart illustrating an example method of determining the width of a beam for performing beam searching by an electronic device according to an embodiment.

According to an embodiment, operations 1310, 1320, 1330, 1340 and 1350 may be performed, for example, through one or more of an electronic device (e.g., electronic device 101 illustrated in FIG. 1), a processor (e.g., processor 120 illustrated in FIG. 1) of the electronic device 101, a wireless communication module (e.g., wireless communication module 192 illustrated in FIG. 1) of the electronic device 101.

According to an embodiment, in operation 1310, the electronic device 101 may determine whether a time interval passed after beam searching is performed matches a beam searching cycle. According to an embodiment, beam searching may be performed periodically. For example, the electronic device 101 may perform beam searching at designated time intervals (e.g., about 20 seconds) and determine whether a time interval passed after the beam searching is performed matches a beam searching cycle.

According to an embodiment, in operation 1310, if a time interval passed after beam searching is performed matches the beam searching cycle (e.g., "YES" for operation 1310), the electronic device 101 may determine that the beam searching cycle is satisfied, and perform operation 1320. According to an embodiment, in operation 1310, if a time interval passed after beam searching is performed does not match the beam searching cycle (e.g., "NO" for operation 1310), the electronic device 101 may perform operation 1310 again.

According to an embodiment, FIG. 13 illustrates only that beam searching is performed periodically, but the scope of the disclosure should not be limited thereto. According to an embodiment, beam searching may be performed aperiodically. For example, if the reception power of a reference signal received from a serving cell is smaller than a preconfigured reference value, the electronic device 101 may perform beam searching.

According to an embodiment, the electronic device 101 may detect a PSS in operation 1320.

According to an embodiment, the electronic device 101 may detect an SSS in operation 1330.

According to an embodiment, in operation 1340, the electronic device 101 may derive at least one standard value for determining the width of a beam for performing beam searching. According to an embodiment, the electronic device 101 may derive, based on a signal received from the serving cell or an adjacent cell, at least one standard value for determining the width of a beam for performing beam searching.

According to an embodiment, the electronic device 101 may derive a first standard value, based on the number of signals, among signals received from the serving cell, having reception powers equal to or greater than a particular power value, excluding a signal having the greatest reception power. According to an embodiment, the first standard value may be derived, for example, using equation 1 below.

$$N_1 = \sum_{n=2}^{N} \text{Sign}(|P_{S1} - P_{Sn}| - Th1), \quad \langle \text{Formula 1} \rangle$$

$$\text{where Sign}(x) = \begin{cases} 0, x < 0 \\ 1, x \geq 0 \end{cases}$$

In formula 1, $N_1$ may indicate a first standard value, $P_{S1}$ may indicate a reception power value of a signal having the greatest reception power, $P_{Sn}$ may indicate a reception power value of a signal excluding a signal having the greatest reception power, Th1 may indicate a first critical value, and N may indicate the number of serving cells.

According to an embodiment, if the first standard value exceeds a sixth threshold value, the electronic device 101 may recognize (or determine) that the surrounding communication environment has a large number of multi-paths. For example, if the first standard value exceeds the sixth threshold value, the electronic device 101 may recognize a non-LOS (line of sight) environment between the electronic device 101 and the base station. According to an embodiment, the sixth threshold value may be stored in the memory 130 of the electronic device 101.

According to an embodiment, in operation 1350, the electronic device 101 may compare the at least one first standard value derived through operation 1340 with the sixth threshold value to determine a width of a beam for performing beam searching. According to an embodiment, if a first standard value derived through formula 1 exceeds the sixth threshold value, the electronic device 101 may perform beam searching using a beam having a first width. According to an embodiment, if the first standard value is smaller than the sixth threshold value, the electronic device 101 may perform beam searching using a beam having a second width. According to an embodiment, the first width may be greater than the second width. According to an embodiment, the electronic device 101 may derive a second standard value, based on the number of reception signals, among reception signals received from the adjacent cell, having reception powers greater than the reception power of a reception signal received from the serving cell. According to an embodiment, the second standard value may be derived, for example, using formula 2 below.

$$N_2 = \sum_{n=1}^{N} \text{Sign}(|T_{S1} - T_{Nn}| - Th2), \quad \langle \text{Formula 2} \rangle$$

$$\text{where Sign}(x) = \begin{cases} 0, x < 0 \\ 1, x \geq 0 \end{cases}$$

In formula 2, $N_2$ may indicate a second standard value, $T_{S1}$ may indicate a reception power value of a serving cell reception signal, $T_{Nn}$ may indicate a reception power value of an adjacent cell reception signal, Th1 may indicate a second critical value, and M may indicate the number of adjacent cells.

According to an embodiment, if the second standard value exceeds a seventh threshold value, the electronic device 101 may recognize (or determine) that the surrounding communication environment has a large number of multi-paths. For example, if the second standard value exceeds the seventh threshold value, the electronic device 101 may recognize a non-LOS environment between the electronic device 101 and the base station. According to an embodiment, the seventh threshold value may be stored in the memory 130 of the electronic device 101.

According to an embodiment, in operation 1350, the electronic device 101 may compare the second standard value derived through operation 1340 with the seventh threshold value to determine a width of a beam for performing beam searching. According to an embodiment, if a second standard value derived through formula 2 exceeds the seventh threshold value, the electronic device 101 may perform beam searching using a beam having a first width. According to an embodiment, if the second standard value is smaller than the seventh threshold value, the electronic device 101 may perform beam searching using a beam having a second width. According to an embodiment, the first width may be greater than the second width, and the sixth threshold value and the seventh threshold value may be the same. According to an embodiment, the electronic device 101 may use the second standard value to determine the number of times of adjacent cell beam searching.

According to an embodiment, in operation 1340, the electronic device 101 may derive a first standard value, based on formula 1 above, and may derive a second standard value, based on formula 2 above. According to various embodiments, in operation 1350, the electronic device 101 may determine a width of a beam for performing beam searching, by comparing an eighth threshold value with the sum of the first standard value and the second standard value. According to an embodiment, in operation 1350, if the sum of the first standard value and the second standard value exceeds the eighth threshold value, the electronic device 101 may determine to use a beam having a first width to perform beam searching. According to an embodiment, if the sum of the first standard value and the second standard value is equal to or smaller than the eighth threshold value, the electronic device 101 may determine to use a beam having a second width to perform beam searching. According to an embodiment, the eighth threshold value may be stored in the memory 130 of the electronic device 101.

According to various embodiments, an electronic device may include: a housing; at least one antenna array including antenna elements comprising at least one antenna arranged in the housing or arranged in a part of the housing; at least one processor operably connected to the antenna array and configured to control the electronic device to generate a first reception beam set including N reception beams (Rx beams) having different directions and a second reception beam set including at least one reception beam having different directions using the antenna array; and a memory operably connected to the processor, wherein the memory is configured to store instructions which, when executed by the processor, control the electronic device to perform frequency scanning on signals transmitted from at least one base station based on N being greater than a first threshold value using at least a part of the second reception beam set, wherein N is an integer equal to or greater than 1, wherein a width of each reception beam included in the second reception beam set is greater than a width of each reception beam included in the first reception beam set.

According to various embodiments, the second reception beam set may include M reception beams, and M may be an integer equal to or greater than 1 and less than N.

According to various embodiments, the instructions, when executed by the processor, control the electronic device to identify a plurality of transmission beams (Tx beams) transmitted from the at least one base station, based on at least a part of a result of the frequency scanning.

According to various embodiments, an electronic device may include: a housing; at least one antenna array including antenna elements comprising at least one antenna arranged in the housing or arranged in a part of the housing; at least one processor operably connected to the antenna array and configured to control the electronic device to generate a first reception beam set including N reception beams (Rx beams) having different directions and a second reception beam set including at least one reception beam having different directions using the antenna array; and a memory operably connected to the processor, wherein the memory is configured to store instructions which, when executed by the processor, control the electronic device to: identify a frequency range for frequency scanning on signals transmitted from at least one base station using at least a part of the first reception beam set; and based on the frequency range being greater than a first threshold value, perform frequency scanning on the signals, based on at least a part of the identified frequency range using at least a part of the second reception beam set, wherein N is an integer equal to or greater than 1, wherein a width of each reception beam included in the second reception beam set is greater than a width of each reception beam included in the first reception beam set.

According to various embodiments, an electronic device may include: a housing; at least one antenna array including antenna elements comprising at least one antenna arranged in the housing or arranged in a part of the housing; at least one processor operably connected to the antenna array and configured to control the electronic device to generate a first reception beam set including N reception beams (Rx beams) having different directions and a second reception beam set including at least one reception beam having different directions using the antenna array; and a memory operably connected to the processor, wherein the memory is configured to store instructions which, when executed by the processor, control the electronic device to: perform frequency scanning using at least a part of the first reception beam set or at least a part of the second reception beam set; measure strengths of signals of a plurality of transmission beams transmitted from at least one base station based on at least a part of a result of the frequency scanning using at least a part of the second reception beam set; and select a transmission beam among the transmission beams based on at least a part of a result of the measurement, wherein N is an integer equal to or greater than 1, wherein a width of each reception beam included in the second reception beam set is greater than a width of each reception beam included in the first reception beam set.

According to various embodiments, the instructions, when executed by the processor, may control the electronic device to measure strengths of signals of the plurality of transmission beams using at least a part of the second reception beam set based on a strength of at least one signal discovered as the result of the frequency scanning being greater than a first threshold value.

According to various embodiments, the instructions, when executed by the processor, may control the electronic device to select the transmission beam, among the plurality of transmission beams, having a greatest signal strength based on the result of the measurement.

According to various embodiments, an electronic device may include: a housing; at least one antenna array including antenna elements comprising at least one antenna arranged in the housing or arranged in a part of the housing; at least one processor operably connected to the antenna array and configured to control the electronic device to generate a first reception beam set including N reception beams (Rx beams) having different directions and a second reception beam set including at least one reception beam having different directions using the antenna array; and a memory operably connected to the processor, wherein the memory is configured to store instructions which, when executed by the processor, control the electronic device to: generate a first beam pair link with a first transmission beam transmitted from a first base station using a first reception beam included in the first reception beam set; measure a strength of at least one signal received through the first beam pair link; and measure strengths of signals transmitted from the first base station and/or at least one second base station adjacent to the first base station based on at least a part of a result of the measurement using the second reception beam set, wherein N is an integer equal to or greater than 1, wherein a width of each reception beam included in the second reception beam set is greater than a width of each reception beam included in the first reception beam set.

According to various embodiments, the instructions, when executed by the processor, may control the electronic device to, based on the result of the measurement being greater than a first threshold value, measure, based on at least a part of a result of the measurement using the second reception beam set, strengths of signals transmitted from the first base station and/or at least one second base station adjacent to the first base station.

According to various embodiments, an electronic device may include: a housing; at least one antenna array including antenna elements comprising at least one antenna arranged in the housing or arranged in a part of the housing; at least one processor operably connected to the antenna array and configured to control the electronic device to generate a first reception beam set including N reception beams (Rx beams) having different directions and a second reception beam set including at least one reception beam having different directions using the antenna array; and a memory operably connected to the processor, wherein the memory is configured to store instructions which, when executed by the processor, control the electronic device to: generate a first beam pair link with a first transmission beam transmitted from a first base station using a first reception beam included in the first reception beam set; identify a first number of at least one signal transmitted from the first base station through the first beam pair link; and measure strengths of signals transmitted from the first base station and/or at least one second base station adjacent to the first base station based on at least a part of the first number using the second reception beam set, wherein N is an integer equal to or greater than 1, wherein a width of each reception beam included in the second reception beam set is greater than a width of each reception beam included in the first reception beam set.

According to various embodiments, the instructions, when executed by the processor, may control the electronic device to; further identify a second number of signals transmitted from the at least one second base station through the first beam pair link; and measure strengths of signals transmitted from the first base station and/or at least one second base station adjacent to the first base station based on at least a part of the first number and the second number using the second reception beam set.

According to various embodiments, a method for performing beam searching by an electronic device in a wireless communication system may include: determining a width of a beam for receiving a signal transmitted from a first base station; receiving a first synchronization signal (SS) block from the first base station, based on the determined beam width; synchronizing with the first base station, based on synchronization information included in the first SS block; and based on a first PBCH included in the first SS block, determining an index of a beam received from the first base station.

According to various embodiments, the method for performing beam searching by the electronic device may include: receiving a second SS block from a second base station, based on the determined beam width, wherein the determining of the index of the beam includes: decoding, by a first decoder, the first PBCH included in the first SS block and simultaneously decoding, by a second decoder, a second PBCH included in the second SS block; and obtaining, based on a result of the decoding of the first PBCH, an index of a beam received from the first base station and obtaining, based on a result of the decoding of the second PBCH, an index of a beam received from the second base station.

According to various embodiments, the determining of the index of the beam may further include: measuring, by a first reference signal measuring unit, a reception power of a first reference signal received from the first base station and simultaneously measuring, by a second reference signal measuring unit, a reception power of a second reference signal received from the second base station; and decoding the first PBCH, based on the reception power of the first reference signal by the first decoder and decoding the second PBCH, based on the reception power of the second reference signal by the second decoder.

According to various embodiments, the determining of the width of the beam may include: identifying a number of reception beams of the electronic device; and based on the identified number of the reception beams of the electronic device exceeding a first threshold value, determining a first width as the width of the beam, and based on the identified number of the reception beams of the electronic device being less than or equal to the first threshold value, determining a second width as the width of the beam, wherein the first width is greater than the second width.

According to various embodiments, the determining of the width of the beam may include: identifying a frequency range for which beam searching is performed; and based on the identified frequency range exceeding a second threshold value, determining a first width as the width of the beam, and based on the identified frequency range being less than and equal to the second threshold value, determining a second width as the width of the beam, wherein the first width is greater than the second width.

According to various embodiments, the determining of the width of the beam may include: identifying a strength of a beam transmitted from the base station; and based on the identified strength of the beam exceeding a third threshold value, determining a first width as the width of the beam, and based on the identified strength of the beam being less than and equal to the third threshold value, determining a second width as the width of the beam, wherein the first width is greater than the second width.

According to various embodiments, the method for performing beam searching by the electronic device may include: receiving a second SS block from a second base station, based on the determined beam width; and based on a power value of a signal received from the first base station or the second base station, determining whether to change the width of the beam for receiving the signal.

According to various embodiments, the determining of whether to change the width of the beam may include: identifying a number of signals, among signals received from the first base station, having reception powers exceeding a first critical value, excluding a signal having a greatest reception power; and based on the number of the signals having reception powers exceeding the first critical value exceeding a fourth threshold value, changing the width of the beam for receiving the signal, to be greater.

According to various embodiments, the determining of whether to change the width of the beam may include: identifying a number of signals, among signals received from the second base station, having reception powers exceeding a second critical value; and based on the number of the signals having reception powers exceeding the second critical value exceeding a fifth threshold value, changing the width of the beam for receiving the signal, to be greater.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, etc. According to an embodiment of the disclosure, the electronic devices are not limited to those described above.

It should be appreciated that various embodiments of the disclosure and the terms used therein are not intended to limit the technological features set forth herein to various example embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated made by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
at least one antenna array comprising at least one antenna;
processing circuitry operably connected to the at least one antenna array, wherein the processing circuitry comprises a plurality of signal measuring circuits and a plurality of decoders; and
memory for storing instructions that, when executed by the processing circuitry, cause the electronic device to:
receive, during a synchronization signal/physical broadcasting channel (SS/PBCH) block measurement time configuration (SMTC) window, a plurality of synchronization signal (SS) bursts respectively corresponding to a plurality of cells including a serving cell and at least one adjacent cell,
wherein each of the SS bursts includes at least one synchronization signal block including a primary synchronization signal (PSS), a secondary synchronization signal (SSS) and a PBCH;
control the plurality of decoders arranged in parallel to simultaneously decode PBCHs included in synchronization signal blocks of the received plurality of SS bursts;
control the plurality of signal measuring circuits arranged in parallel to simultaneously measure signal strengths of a plurality of beams respectively corresponding to the synchronization signal blocks of the received plurality of SS bursts;
select an optimal beam among the plurality of beams respectively corresponding to the synchronization signal blocks based on the measured signal strengths; and perform communication with a cell using the selected optimal beam, wherein the electronic device synchronizes with the cell using a PSS and the SSS included in a synchronization signal block corresponding to the selected optimal beam.

2. The electronic device of claim 1, wherein the instructions, when executed by the processing circuitry, cause the electronic device to receive the plurality of SS bursts during duration of a designated time interval, and wherein the SMTC window is configured to be longer than the designated time interval.

3. The electronic device of claim 1, wherein a single SS block correspond to a single beam.

4. The electronic device of claim 3, wherein the instructions, when executed by the processing circuitry, cause the electronic device to:

measure the signal strengths of each of the plurality of beams through a plurality of SS blocks corresponding to the plurality of beams.

5. The electronic device of claim 1, wherein the instructions, when executed by the processing circuitry, cause the electronic device to receive the plurality of SS bursts during the SMTC window, and simultaneously process the plurality of SS bursts using the plurality of signal measuring circuits and the plurality of decoders.

6. The electronic device of claim 5, wherein the instructions, when executed by the processing circuitry, cause the electronic device to:

simultaneously track a transmission beam of the at least one adjacent cell with a transmission beam of the serving cell, using the plurality of signal measuring circuits and the plurality of decoders while the electronic device is performing reception beam sweeping for beam searching.

7. The electronic device of claim 1, wherein the plurality of signal measuring circuits are configured to simultaneously process reception of the plurality of SS bursts from the plurality of cells.

8. The electronic device of claim 1, wherein the instructions, when executed by the processing circuitry, cause the electronic device to:

measure, by a first reference signal measuring circuit, a reception power of a first reference signal received from the serving cell and simultaneously measure, by at least one second reference signal measuring circuit, a reception power of a second reference signal received from the at least one adjacent cell.

9. The electronic device of claim 8, wherein the instructions, when executed by the processing circuitry, cause the electronic device to:

determine, based on a first PBCH included in a first SS block, an index of a beam received from the serving cell, and determine, based on a second PBCH included in at least one second SS block, an index of a beam received from the at least one adjacent cell.

10. The electronic device of claim 9, wherein the instructions, when executed by the processing circuitry, cause the electronic device to:

decode, by a first decoder, the first PBCH included in the first SS block received from the serving cell and simultaneously decode, by at least one second decoder, the second PBCH included in the at least one second SS block received from the at least one adjacent cell.

11. The electronic device of claim 10, wherein the instructions, when executed by the processing circuitry, cause the electronic device to:

decode the first PBCH, based on the reception power of the first reference signal by the first decoder and simultaneously decode the second PBCH, based on the reception power of the second reference signal by the at least one second decoder.

12. The electronic device of claim 11, wherein the instructions, when executed by the processing circuitry, cause the electronic device to:

obtain, based on a result of the decoding of the first PBCH, an index of a beam received from the serving cell, and obtain, based on at least one result of the decoding of the second PBCH, an index of a beam received from the at least one adjacent cell.

13. The electronic device of claim 1, wherein the instructions, when executed by the processing circuitry, cause the electronic device to perform beam management on the plurality of cells during a configured time interval using the plurality of signal measuring circuits and the plurality of decoders through a time control circuit.

14. The electronic device of claim 1, wherein the serving cell and the at least one cell are included in the same base station, or included in base stations different from each other.

15. A method of an electronic device comprising at least one antenna array and processing circuitry comprising a plurality of signal measuring circuits and a plurality of decoders, the method comprising:

receiving, during a synchronization signal/physical broadcasting channel (SS/PBCH) block measurement time configuration (SMTC) window, a plurality of synchronization signal (SS) bursts respectively corresponding to a plurality of cells including a serving cell and at least one adjacent cell, wherein each of the SS bursts includes at least one synchronization signal block including a primary synchronization signal (PSS), a secondary synchronization signal (SSS) and a PBCH;

controlling the plurality of decoders arranged in parallel to simultaneously decode PBCHs included in synchronization signal blocks of the received plurality of SS bursts;

controlling the plurality of signal measuring circuits arranged in parallel to simultaneously measure signal strengths of a plurality of beams respectively corresponding to the synchronization signal blocks of the received plurality of SS bursts;

selecting an optimal beam among the plurality of beams respectively corresponding to the synchronization signal blocks based on the measured signal strengths; and performing communication with a cell using the selected optimal beam, wherein the electronic device synchronizes with the cell using a PSS and the SSS included in a synchronization signal block corresponding to the selected optimal beam.

16. The method of claim 15, further comprising:

simultaneously tracking a transmission beam of the at least one adjacent cell with a transmission beam of the serving cell, using the plurality of signal measuring circuits and the plurality of decoders while the electronic device is performing reception beam sweeping for beam searching.

17. The method of claim 16, further comprising:
measuring, by a first reference signal measuring circuit, a reception power of a first reference signal received from the serving cell and simultaneously measuring, by at least one second reference signal measuring circuit, a reception power of a second reference signal received from the at least one adjacent cell,
decoding a first PBCH, based on the reception power of the first reference signal by a first decoder and simultaneously decoding a second PBCH, based on the reception power of the second reference signal by at least one second decoder.

18. The method of claim 17, further comprising:
obtaining, based on a result of the decoding of the first PBCH, an index of a beam received from the serving cell, and
obtaining, based on at least one result of the decoding of the second PBCH, an index of a beam received from the at least one adjacent cell.

\* \* \* \* \*